Dec. 24, 1957   LE ROY J. LEISHMAN   2,817,766
X-RAY SPOT FILM DEVICES

Filed March 1, 1954   11 Sheets-Sheet 4

INVENTOR:
Le Roy J. Leishman

Dec. 24, 1957 LE ROY J. LEISHMAN 2,817,766
X-RAY SPOT FILM DEVICES
Filed March 1, 1954 11 Sheets-Sheet 5

INVENTOR:
Le Roy J. Leishman

Dec. 24, 1957   LE ROY J. LEISHMAN   2,817,766
X-RAY SPOT FILM DEVICES
Filed March 1, 1954   11 Sheets-Sheet 6

INVENTOR:
Le Roy J. Leishman

Dec. 24, 1957  LE ROY J. LEISHMAN  2,817,766
X-RAY SPOT FILM DEVICES
Filed March 1, 1954  11 Sheets-Sheet 7

INVENTOR:
Le Roy J. Leishman

Dec. 24, 1957 LE ROY J. LEISHMAN 2,817,766
X-RAY SPOT FILM DEVICES
Filed March 1, 1954 11 Sheets-Sheet 8
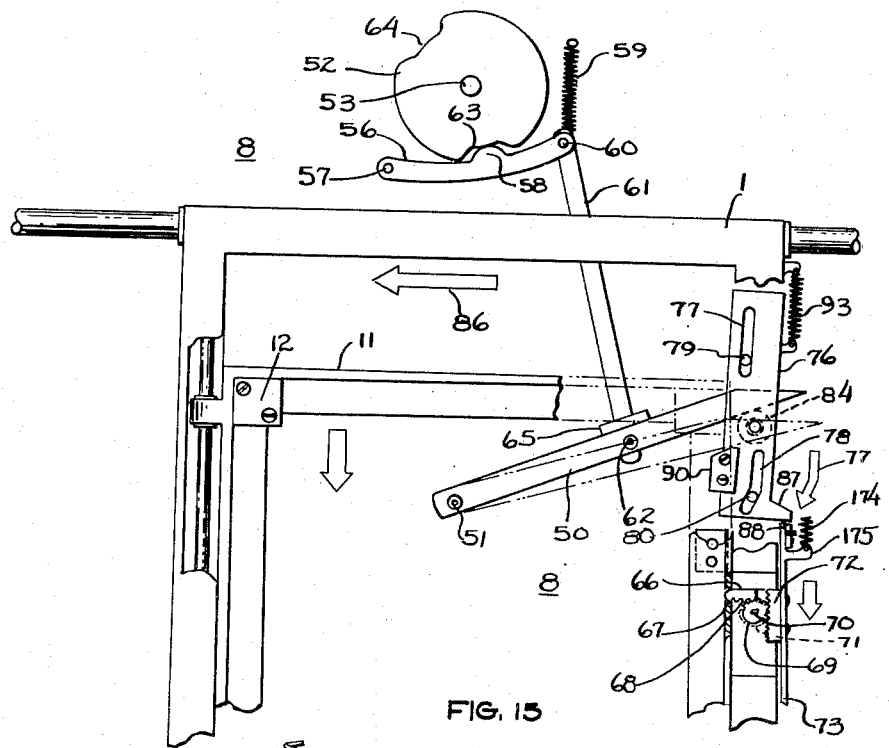
FIG. 15
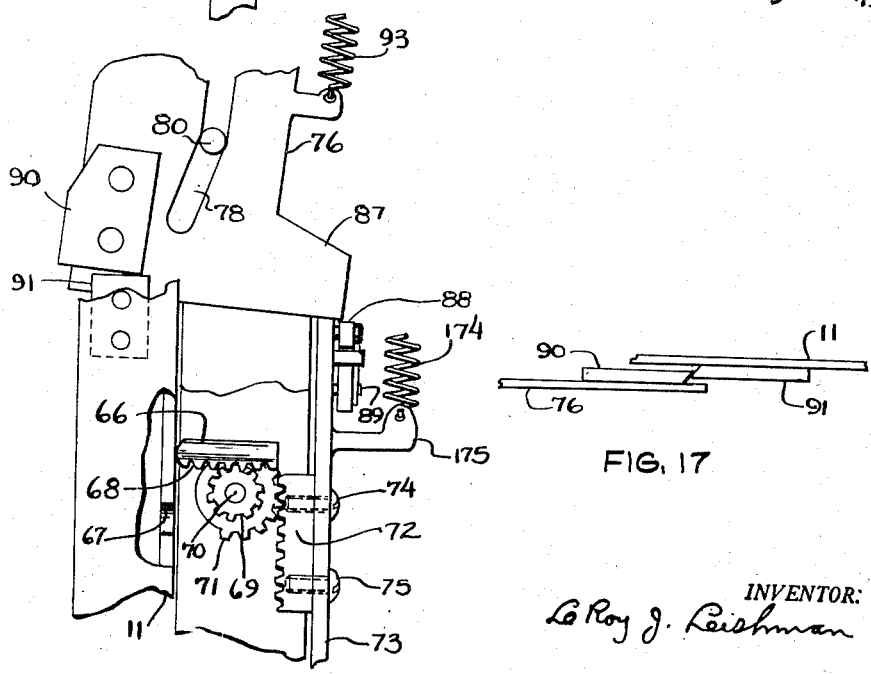
FIG. 16
FIG. 17
INVENTOR:
Le Roy J. Leishman Dec. 24, 1957   LE ROY J. LEISHMAN   2,817,766
X-RAY SPOT FILM DEVICES
Filed March 1, 1954   11 Sheets-Sheet 9
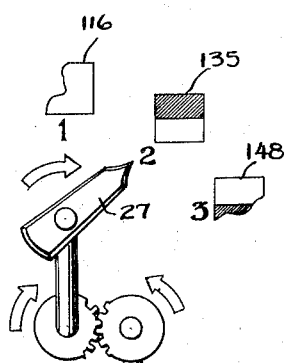
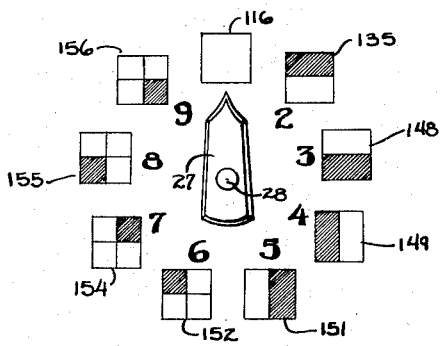
FIG. 18
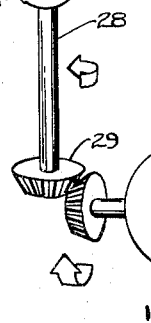
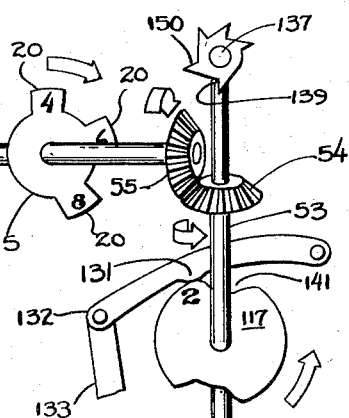
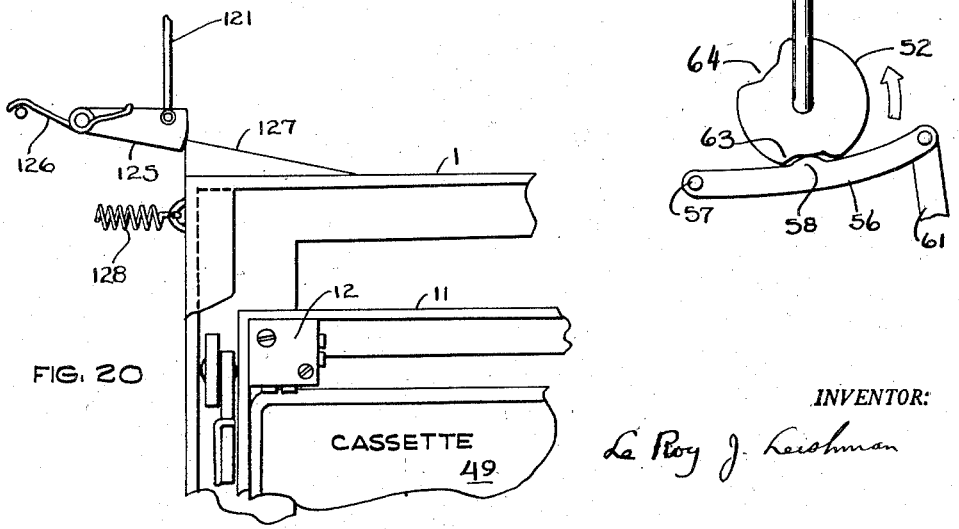
FIG. 19
FIG. 20
INVENTOR:
Le Roy J. Leishman

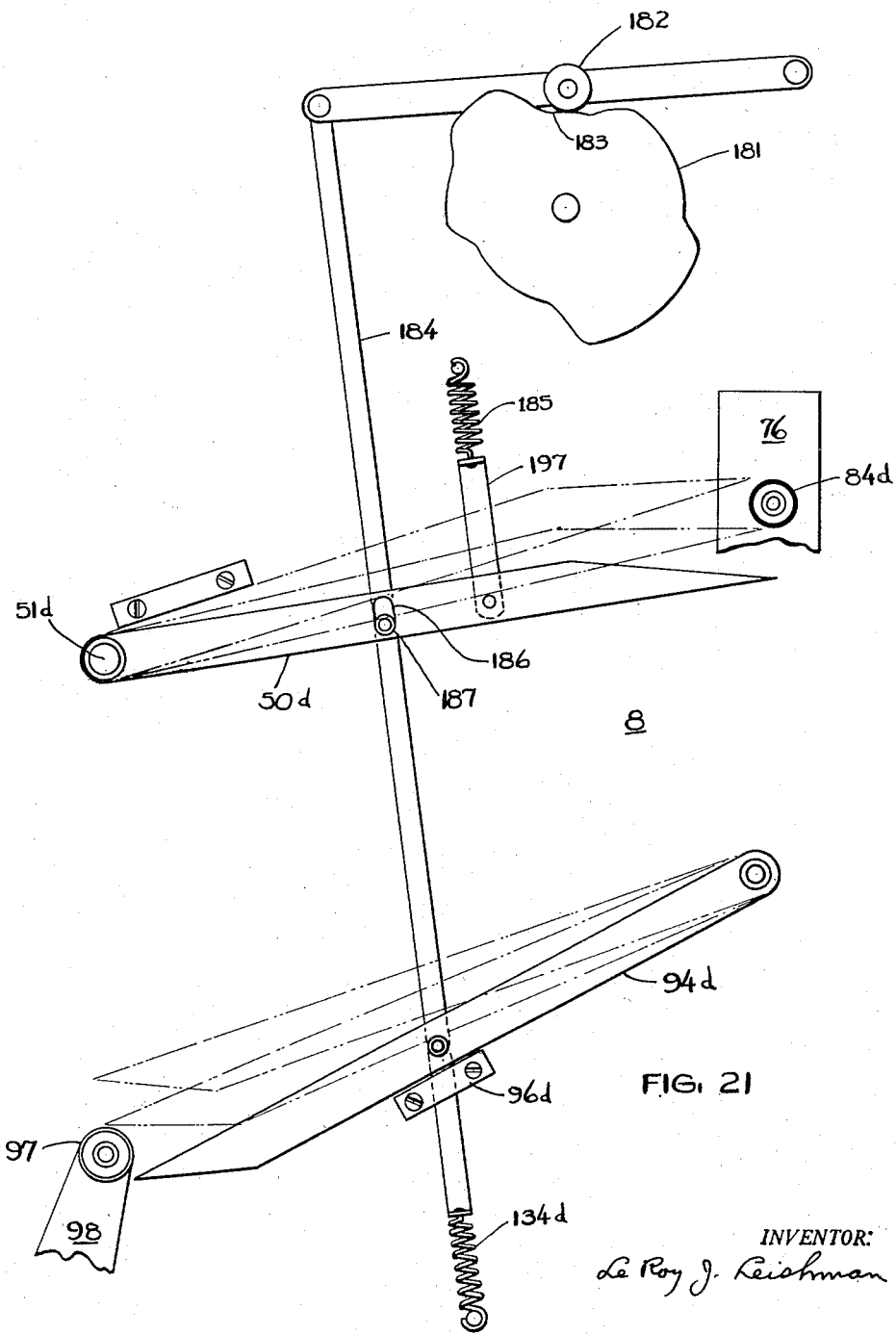

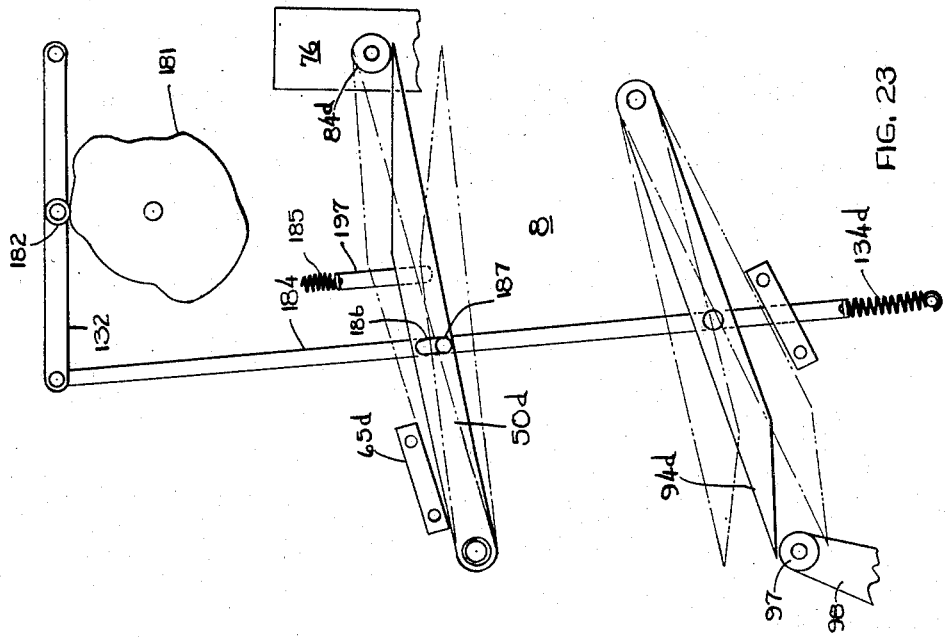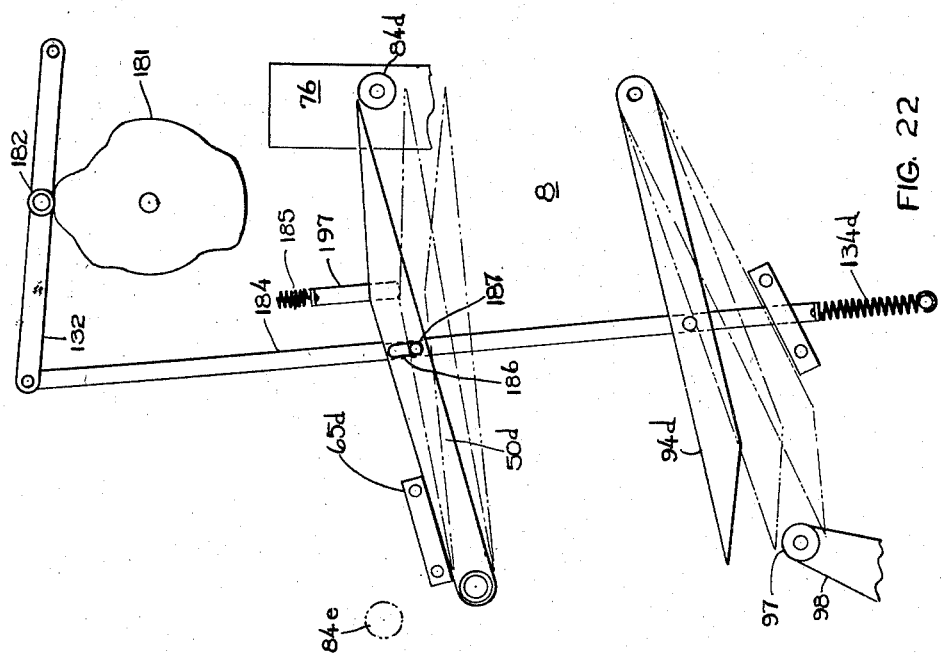

United States Patent Office 2,817,766
Patented Dec. 24, 1957

2,817,766

X-RAY SPOT FILM DEVICES

Le Roy J. Leishman, Los Angeles, Calif.

Application March 1, 1954, Serial No. 413,181

24 Claims. (Cl. 250—66)

The invention herein described pertains to X-ray equipment and more particularly to devices for making instantaneous radiographs of body sections previously viewed on a fluoroscopic screen. Such instruments are usually called spot film devices or spot film tunnels.

In devices of this class it is highly desirable to be able to make from one to four exposures on the same film. Sometimes a radiologist desires to expose the right side of the film and then the left. It is also frequently desirable to be able to expose first the top half of the film and then the lower half; and for radiographs of body sections having a small area, it is common practice to make four exposures on the same film. It is desirable that the spot film device be capable of producing any of these combinations with the film disposed either vertically or horizontally.

In order that the radiographs may be as sharp as possible, the distance from the underside of the device to the film should be kept at a minimum. The shorter this distance the less penumbra will be involved, and the definition will therefore be sharper.

It frequently happens that the condition which the radiologist desires to capture on a radiograph is a very transitory one, and it is consequently desirable that it be possible to expose the film within not more than a fraction of a second from the instant when the fluoroscopic image reveals something that may have diagnostic significance. In order to meet these requirements, the cassette containing the film that is to be exposed should be movable from its shielded position outside the field of the X-rays to an exposable position at least partially within the X-ray beam in the shortest possible interval of time. Vibration due to the rapid stoppage of the cassette must of course subside very rapidly so that the film will be completely at rest when the exposure is made.

Whether the patient is standing or reclining during fluoroscopy, the longitudinal axis of the spot film device extends across the patient. As a consequence, the distance between the edge of the screen nearest the patient's head to the adjacent edge of the fluoroscopic screen, determines how high on the thoracic cavity an examination can be made without the said edge of the device encountering the patient's chin. It is consequently desirable that this distance be as short as possible. In vertical fluoroscopy, the distance between the lower edge of the spot film device and the adjacent edge of the fluoroscopic screen determines how far under the device the fluorocopist must reach with his hand in order to palpate portions of the patient lying beneath the screen. To keep such reach at a minimum, this marginal distance should also be short.

To serve the aforementioned ends, one object of my invention is to enable the fluoroscopist to obtain the aforementioned variety of radiographs on a single film without requiring a spot film device having margins around the screen that are excessively wide.

Another object of my invention is to provide a device that will enable the fluoroscopist to take any of the aforementioned combinations of radiographs on a single film without having to remove or handle the cassette.

Another object is to make it possible to procure the aforementioned combinations of exposures on a single film regardless of whether such film is disposed with its longitudinal axis parallel to or transverse to the longitudinal axis of the spot film tunnel.

Another object of my invention is to provide means for reducing and rapidly damping any vibration that may be caused by the sudden deceleration of the cassette carriage as it comes to rest in the position in which the exposure is to be made after its fast travel from its rest or shielded position outside the X-ray beam.

Another object is the provision of means whereby the deceleration of the cassette carriage will be gradual and at substantially the same rate regardless of the distance that the carriage must travel to bring the proper portion of the film to the center of the fluoroscopic screen.

Another object is to make it possible for the desired exposure on a single film to be made in predetermined sequence automatically after a sequence-selecting control has once been adjusted for such sequence.

A further object of my invention is to provide a device that will achieve the aforementioned objectives and yet be simple in construction.

Still another object is to provide a device of the character described that will be reliable and durable and not likely to get out of order even though the operator may not observe reasonable care.

In order to achieve the last mentioned objectives, subsidiary objects of my invention are as follows:

To provide simple means for moving the cassette downward from a central position.

To provide simple means for moving the cassette upward for a distance substantially equal to either one-fourth or one-half of the distance across the film in either direction.

Another subsidiary object is the provision of suitable cams to control the operation of the aforementioned means for moving the cassette.

Another such object is the provision of a cam-operating mechanism in which the cams will be simple in construction and free from abrupt breaks in the camming surfaces.

Another object is the provision of alternative cam control mechanisms using (a) peripheral cams with spring loaded followers, (b) double cams with individual followers that are interconnected in such manner that spring loading is not required, and (c) internal cams that will avoid the necessity of such spring loading.

Still another object is the provision of means for shifting the cassette upward or downward by means of an inclined plane cooperating with a follower interposed between such plane and the cassette.

Another object is to provide one inclined plane or elongated cam and a cooperating follower for moving the cassette upward and a second inclined plane or elongated cam and a cooperating follower for moving the cassette downward.

A further object is the provision of means for moving one of these elongated cams or inclined planes from a rest to an active position, or vice versa, irrespective of the position or movement of the other elongated cam or inclined plane.

Still another object is the provision of means for moving one such elongated cam from a rest to an active position while moving the other cam from an active to a rest position.

Another object is the provision of simple control means for pre-setting the apparatus so that any desired sequence of exposures will be automatically made without further attention from the fluoroscopist.

Yet another object is the provision of simple selectively operable means for stopping the cassette carriage at different positions as it moves into the X-radiated area of the device.

Still other objects will appear as the specification proceeds.

In the drawings:

Fig. 15 is a plan view, partly broken away, showing the various parts that cooperate when the cassette frame is to be moved from a central position within the main carriage to a lower position within the carriage.

Fig. 16 is an enlargement of a portion of Fig. 15, but showing the parts in another operating position.

Fig. 17 is a right side view of some of the parts shown in Figs. 15 and 16.

Fig. 18 is an enlarged view of the manual knob and dial used by the fluoroscopist or X-ray technician to set up the particular sequence of radiographs that are to be made. The same pointer-knob and dial also indicates what portion of the film will be exposed when the next radiograph is made.

Fig. 19 is a schematic diagram showing the coordination between the indicator, dial, cams, stops, and interconnecting links that operate certain other portions of the mechanism.

Fig. 20 is a plan view, partly in section, showing the cooperation between the carriage and latch when the carriage is in its home or shielded position beneath the opening through which the cassettes are inserted and removed.

Figs. 21, 22 and 23 illustrate a modified embodiment of my invention in which a single cam controls the inclined plane or camming means for moving the cassette down as well as the inclined plane or camming means for moving the cassette up. Fig. 21 shows in full lines the lower of these inclined planes in operative position; Fig. 22 shows in full lines the upper of the inclined plane in operative position; and Fig. 23 shows in full lines a situation in which neither of the inclined planes is in operative position.

Figure 1:
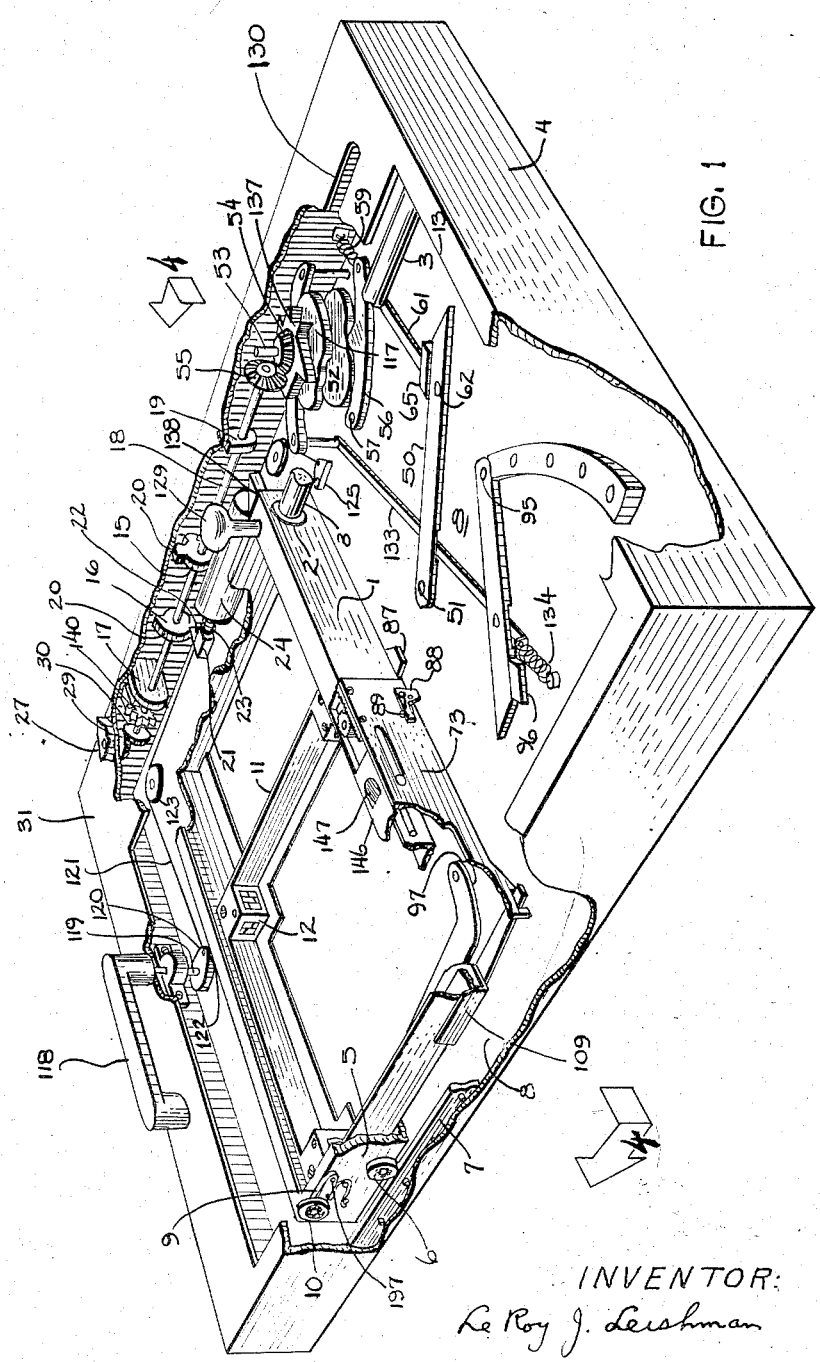
Fig. 1 is a broken away perspective view of one embodiment of my invention.
Figure 2:
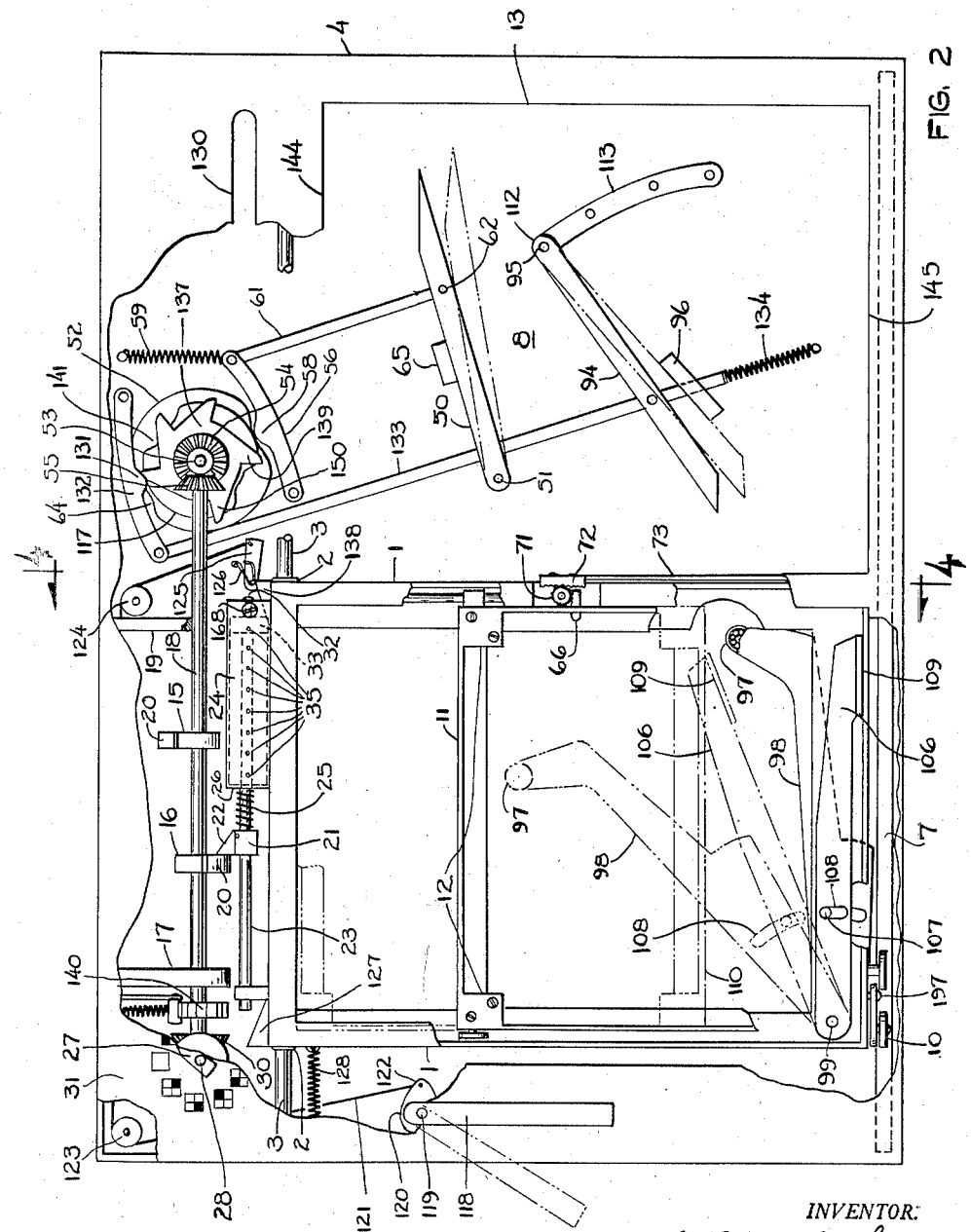
Fig. 2 is a plan view, partly broken away, of the structure shown in Fig. 1.

In the embodiment of my invention illustrated in Figs. 1 and 2, the carriage 1 is mounted by means of suitable longitudinal bearings 2 embodied therein upon rod 3 which is rigidly mounted in the housing 4. The lower end 5 of the carriage is provided with a pair of rollers or ball bearings 6, Figs. 1 and 4, that ride upon a track or bar 7 which extends along the lower inner wall of the frame adjacent to the base 8. A short arm 9 is pivoted to the lower end 5 of the cassette carriage at point 197. This bar carries a roller or ball-bearing 10 at its outer end, and the arm is spring loaded so that the roller presses upward on the underside of the top or cover of the frame, thus keeping the carriage as close to the base 8 as the rollers 6 will permit. It will be understood that a second arm similar to arm 9 is symmetrically disposed near the opposite end of member 5, the portion of member 5 and the arm that is mounted thereon being cut away in the Fig. 1 view. A frame 11 is appropriately mounted within the carriage 1 for movement in a direction transverse to the longitudinal axis of the complete device. The corners of the frame 11 are provided with suitable means 12 for holding the cassette in the frame, as shown in Figs. 1, 2, 8, 9, 12, 13, 14, 15 and 20. The cassette has been omitted from the other figures to show the mechanism more clearly.

Figure 5:
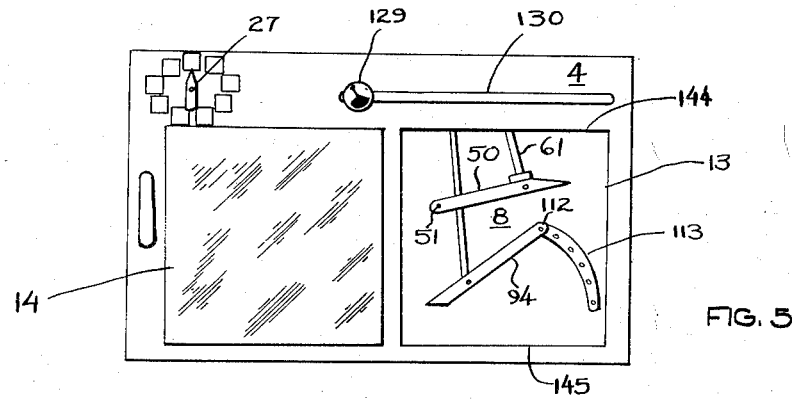
Fig. 5 is a plan view of my device including the manually operable knob for returning the cassette carriage to its shielded position after an exposure has been made. This view also shows one form of control for pre-selecting a desired sequence of exposures.

The carriage containing the cassette-receiving frame 11 is normally disposed within the right end of the housing when the said housing is oriented as indicated in Figs. 1, 2 and 5. When these parts are so disposed, the cassette is accessible through the opening or window 13, Fig. 5, in the cover. A second window 14 accommodates the fluorescent screen and the usual X-ray protective lead glass. Inasmuch as the screen and lead glass occupy the same area as the window, the reference numeral 14 will be used interchangeably throughout this specification to refer to the screen or glass as well as to the window or opening.

Spot film devices or tunnels are so mounted with respect to the other X-ray apparatus with which they cooperate that the spread of the X-rays is confined within the limits of the screen. When the carriage is in its "home" position at the right end of the device, the cassette carriage is thus beyond the reach of the primary X-rays, regardless of whether or not the tunnel is equipped with X-ray absorbing material on the base of the device. Such shielding, however, is usually provided to protect the film within the cassette from the effects of secondary radiation from the patient, such secondary radiation being scattered, as is well known, from the body sections through which the X-rays pass during either radiography or fluoroscopy.

During the greater part of a fluoroscopic procedure, the fluoroscopist is examining the fluoroscopic images that appear upon the screen within the confines of the window 14, Figs. 5, 12, 13 and 14. Whenever he desires to make a radiograph of what he sees upon the screen, it is necessary that the carriage rapidly move from its home or shielded position to a second position in which at least a portion of the film is within the X-ray beam. If a single large radiograph is to be made, the cassette must be moved to a location in which it will be disposed symmetrically behind the screen both laterally and vertically. Such lateral positioning is obtained by controlling the position in which the carriage will stop as it moves from right to left. This is done by a series of stopping abutments 15, 16 and 17, the first two of which are rigidly mounted at spaced intervals upon the rotatable shaft 18. Abutment 17 may either be mounted upon shaft 18, as shown in Figs. 12, 13, 14 and 19, or upon the housing, as shown in Figs. 1 and 2. Shaft 18 is journaled in suitable supports 19, only one of which shows in the illustrations. Stopping abutments 15 and 16 have projections 20 thereon that extend radially beyond the remaining portions of the said abutments, and the abutments are so oriented with respect to each other that in certain angular positions of the shaft 18 a projecting portion 20 of one or other of the abutments will extend toward the carriage 1. In Figs. 1 and 2, abutment 16 is so oriented. When the projecting portion 20 of this abutment extends toward the carriage, as in these figures, the cooperation of portion 20 with other components of the device will be such that the carriage upon its leftward movement will stop at a position in which it will be centrally disposed with respect to the screen area 14, Figs. 5 and 12. Such stoppage is effected by means of a longitudinal movable abutment comprising a dog 21 and a pawl-like member 22 pivotally mounted thereon, the said dog 21 being rigidly attached to the shaft 23 of the dash-pot 24. An expansion spring 25, Fig. 2, expands between the dog 21 and the forward end 26 of the cylinder 24, and the dog is therefore at its furthest distance from the cylinder whenever the carriage starts to move toward the screen from its shielded or home position. As the carriage proceeds to the left, the pawl-like member 22 engages the projection 20 that happens to be oriented toward the carriage. When projection 20 of abutment 16 is in such position, this particular projection will be the one that intercepts member 22 as the carriage 1, including the dash-pot assembly, moves leftward. After the initial engagement, the plunger will telescope within the cylinder of the dash-pot 24 until it has reached the end of its stroke. Further leftward movement of the carriage will thus be arrested and the carriage will have stopped at a position determined by the position of abutment 16 upon shaft 18. In the illustrative example here being discussed, this is a position in which the carriage will be symmetrically disposed with respect to the screen 14, Fig. 12. A cassette 49, such as those used to contain the film for exposure to X-rays, is here shown within the frame 11, and it will be noted that the center of the cross, marking the center of the film or cassette, coincides with the dot indicating the center of the screen. It will also be observed in this figure that the pawl 22 is in engagement with projection 20 of abutment 16.

Figure 13:
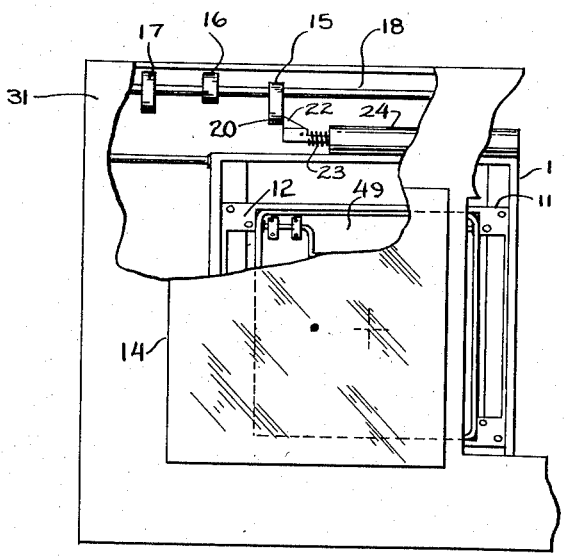
Fig. 13 shows a cassette within the cassette frame, and the various parts are so positioned that the left half of the cassette is aligned with the center of the screen.

In certain other angular positions of shaft 18, the projection 20 of abutment 15 will extend toward the carriage. In such cases, the member 22 will be arrested in its leftward movement from its rest position by the projecting portion 20 of abutment 15, and the carriage will come to rest in a position to the right of the central position in which it stops when abutment 16 intercepts member 22. The position in which the carriage is stopped by abutment 15 is shown in Fig. 13, and it will be seen that the center of the screen is to the left of the center of the cassette, and that the center of the left half of the cassette is aligned with the center of the screen.

Figure 14:
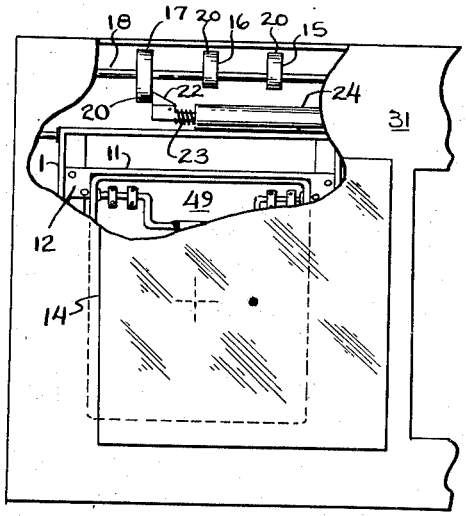
Fig. 14 is a view similar to that of Fig. 13, but shows the right half of the cassette aligned with the center of the screen.

When the angular position of shaft 18 is such that member 22 is not intercepted by projections 20 of abutment 15 or abutment 16, the carriage on its leftward movement will not stop until member 22 engages abutment 17. The axial or longitudinal position of this abutment with respect to shaft 18 and the other abutments is such that the carriage will position the cassette as shown in Fig. 14. It will be noted in this figure that the center of the cassette is to the left of the center of the screen 14, but that the center of the right half of the cassette is aligned with the screen's center.

Inasmuch as abutment 17 is the final abutment, it is not necessary that it be mounted upon shaft 18. It may be a stationary stop, since its purpose is to arrest the carriage after its maximum travel. Abutment 17 automatically becomes effective whenever member 22 has not previously been intercepted by abutments 15 or 16 during the leftward movement of the carriage.

It will readily be understood that additional abutments may be mounted upon shaft 18 if more stopping positions are required than are indicated in the figures.

The angular position of the shaft 18 may be controlled by the manually movable indicator 27, Figs. 1, 2 and 18. This indicator is connected to a short shaft 28 upon which is also rigidly mounted a miter gear 29, which meshes with a mating miter gear 30 fixed upon shaft 18. The indicator knob 27 may cooperate with a series of numbers or other indicia appropriately arranged on the top cover 31 of the main housing, and the stopping position of the carriage upon its movement into the field may be controlled by turning the indicating knob 27 toward the dial indication corresponding to the angular position in which the shaft 18 must be oriented in order to make the proper abutment effective.

My invention includes means whereby the angular position of the shaft 18 is automatically changed upon the movement of the carriage 1 into or out of the field. This mechanism, however, also controls the movement of the cassette frame 11 in a direction transverse to the longitudinal axis of the complete device, and a description of this mechanism for automatically changing the angular position of the shaft 18 will therefore be deferred until the apparatus for moving the cassette frame within the carriage 1 has been explained.

The dash-pot 24 is of course only useful in connection with stopping the movement of the carriage 1 in its leftward movement, and since we are now concerned with such stopping of the cassette carriage, the action of the dash-pot 24 and the components associated therewith will now be described.

Decelerators and cushioning means using cylinders filled with air, oil or water are well known in the various arts, but the decelerators used in connection with my invention are employed in a novel way and are components of new combinations in which they cooperate with associated elements in a different way from that in which they have functioned in other apparatus in which they have previously been employed. In some of the spot film devices of the prior art, the cylinder of the decelerator is mounted on the housing or stationary portion of the device, and the stopping abutments that determine the position in which the travel of the carriage will be arrested are also mounted upon stationary portions of the device. The deceleration consequently begins after the carriage has traveled a specific distance from the starting position, rather than at a specific distance in advance of the particular position in which the carriage is to stop. The plunger of the decelerator in such devices is engaged by a dog rigidly mounted on the carriage, and the various parts of the mechanism are so arranged that the dog engages the plunger just before the various stopping positions have been reached. As a consequence, only a portion of the cylinder or dash-pot is used when stopping in the first position; an additional portion is employed when stopping in an intermediate position; while substantially all of the dash-pot is used in stopping in the final position. This results in unequal deceleration in the various stopping positions. Hence, if the dash-pot is constructed or adjusted to provide a smooth stop in one position, the amount of deceleration for the other stops will not be satisfactory. In my arrangement, however, the deceleration is substantially uniform for each stop because the dash-pot or cylinder is mounted on the carriage proper, and its stroke is the same regardless of which of the various stopping abutments is engaged.

Figure 4:
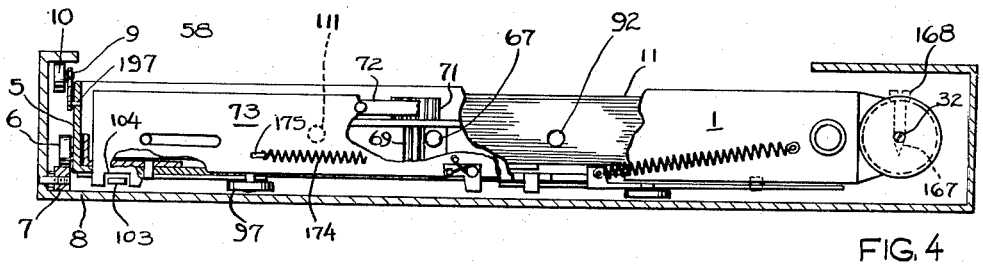
Fig. 4 is a view taken on line 4—4 of Figs. 1 and 2.

In the preferred embodiment of my invention, I use a cylinder filled with air, and the cylinder is provided with an orifice 32, at one end, Figs. 2 and 4. The effective size of this orifice is controlled by a needle valve 167, Fig. 4, which is adjusted by means of a screw 168, Figs. 2 and 4. The adjustment should be such that the air will escape from the cylinder at a rate that will assure fairly uniform deceleration for the various stopping positions as the plunger 33, attached to the shaft 23, approaches the end of the cylinder.

As the carriage 1 returns to its shielded position after having been stopped by one or other of the abutments, the compression spring 25 expands between the dog 21 and the end 26 of the cylinder, thus forcing plunger 33 outwardly. Air is meanwhile sucked through orifice 32 to fill the cylinder 24. When member 22 initially engages one or other of the abutments, the plunger readily moves within the cylinder until the air is compressed sufficiently to have a decelerating effect. After this point has been reached, the speed of relative movement of the plunger and cylinder is determined by the speed at which the air is forced through the orifice 32. The speed of the carriage after the initial engagement of member 22 with one of the abutments, thus becomes progressively slower as the air is compressed. The rate of movement is then fairly uniform, the final speed of deceleration being determined by the rate at which the air is forced through the orifice.

It is very desirable that the rate of deceleration approximate the rate of deceleration of a shaft connected to a pitman whose other end is attached to a rotating wheel at a point displaced from its axis; in other words, the carriage should slow down with what might be called harmonic motion. Such a rate of deceleration can be approximated by gradually varying the effective size of the escape orifice or orifices. One means for controlling the rate of escape of the air from the cylinder is indicated in Fig. 2, where a series of holes 35 is shown in the cylinder 24. When member 22 initially engages one of the abutments, the plunger 33 will of course be at the left end of the cylinder 24; and as the plunger moves toward the right end, the air will first be forced through all of the orifices 35 and then gradually through a constantly lesser number of orifices as the plunger continues to move to the right; and a point will finally be reached when the only remaining escape port will be the orifice 32. The speed of movement of the plunger and therefore of the carriage will thus constantly decrease until the plunger and the carriage finally come to rest with the plunger 33 at the end of its stroke and substantially all of the air forced from the cylinder.

Figure 6:
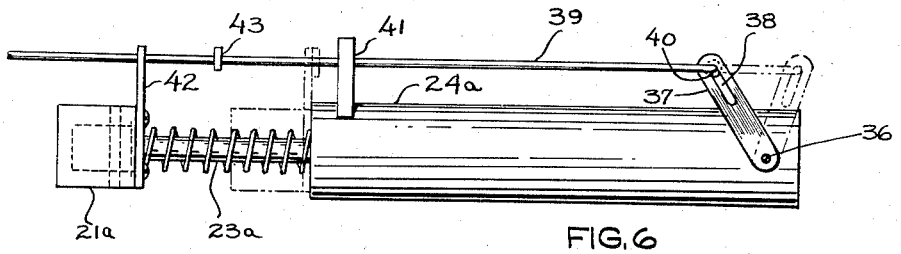
Fig. 6 is an illustration of a modified form of decelerator for the cassette carriage in spot film devices embodying my invention.

Another method of progressively reducing the effective size of the escape orifice is indicated in Fig. 6 where the shaft 36 controls the opening and closing of the escape valve or port. The arm 37 is rigidly attached to shaft 36, and the arm 37 is provided with a slot 38 to receive a pin which may be integral with, or attached to, one end of the rod 39. A head or peened over portion 40 on the end of such pin prevents it from moving out of the slot 38. The rod 39 is journaled in a bracket 41 attached to the cylinder 24a and in a second bracket 42 attached to the dog 21a. As the shaft 23a moves into the cylinder 24a, bracket 42 engages collar 43 attached to the rod 39, the position of collar 43 on this shaft being such that the engagement takes place at the instant when deceleration is to start. As bracket 42 continues to move toward the cylinder 24a it will push the collar 43 and shaft 39 toward the right, as these parts are seen in Fig. 6; and the lever 37, moving in response to the movement of shaft 39, will rotate from the position shown in full lines to the position shown in dotted lines. Lever 37 will turn the valve-controlling shaft 36, and the air escape orifice will gradually close. Inasmuch as the speed of movement of shaft 23a will decrease as the effective size of the escape orifice decreases, the movement of the shaft 23a will be gradually decelerated, and the relative motion of dog 21a and cylinder 24a will be correspondingly decelerated, as will also movement of any parts attached to either of these relatively movable members. In one embodiment of my invention, the cylinder 24a and the parts with which it is associated in Fig. 6, are mounted upon the carriage in substantially the same manner as the cylinder 24 in the embodiment shown in Fig. 2; and the relative interaction of the related parts is likewise the same.

Figure 7:
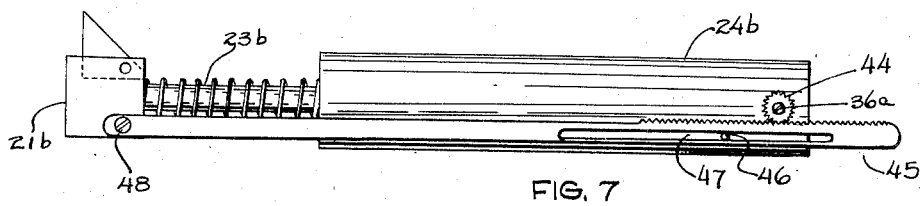
Fig. 7 illustrates other modifications in the apparatus for decelerating the movement of the cassette carriage.

Fig. 7 illustrates still another method for obtaining gradual deceleration approximating harmonic motion. In this embodiment, a gear 44 is rigidly attached to shaft 36a which operates the escape valve. A rack 45 meshes with gear 44 and is constrained to move longitudinally by a pin 46 attached to the cylinder 24b, which said pin 46 fits in a slot 47 in the said rack. The other end of the member comprising the rack 45 is attached to dog 21b by any suitable means such as by screw 48. As the shaft 23b moves into the cylinder 24b, the rack 45, meshing with gear 44, causes this gear and the connecting shaft 36a to turn, thus gradually closing the air escape port controlled thereby. As in the dash-pot arrangements pictured in Figs. 2 and 6 the embodiment shown in Fig. 7 also effects a gradual deceleration.

As mentioned in the objects, one purpose of my invention is to make it possible to take as many as four different radiographs on a single film. When such exposures are made, or when two exposures are made, one above the other, the frame 11 holding the cassette must be at its lowermost position within the carriage 1 when the first exposure is made. If the frame is in a central position within the carriage when the cassette is loaded therein while the carriage is in its home or shielded position, it is necessary for the frame 11 to move downward in the carriage from such central position to its lowermost position during the time that the carriage is moving leftward— in order that the center of the upper half of the film, or the center of one of the quarters, will register with the approximate center of the screen 14. Such downward movement of the frame 11 is effected by means of an inclined plane or elongated cam 50 cooperating with associated parts hereinafter described. This elongated cam is pivoted on a stub shaft 51 suitably affixed to the base 8 of the main housing. This elongated cam or plane is capable of being rotatably moved between two different positions, these positions being indicated respectively in full and broken lines in Figs. 2 and 15.

The position of cam 50 is determined or controlled by a rotatable cam 52, Figs. 1, 2 and 15, rigidly attached to a short shaft 53 upon which is also mounted a miter gear 54 which meshes with another miter gear 55 that is fixed to shaft 18. This is the shaft upon which abutments 15, 16, and sometimes 17, as previously mentioned, are also mounted. The dial 27, as hereinbefore explained, is operatively connected to this shaft, and the dial may therefore be turned to an appropriate mark which will indicate the angular position in which cam 52 must be disposed in order to bring the elongated cam 50 into the full line position shown in Figs. 2 and 15. It will be noted in these figures, as well as in Figs. 1 and 19, that this cam has two depressions in its periphery, and that aside from these indentations all parts of the periphery are at a uniform radial distance from the axis. A lever 56 is pivoted to the base 8 by means of a short shaft or rivet 57. A follower 58, which may be integral with lever 56, is held in contact with the periphery of cam 52 by means of an expansion spring 59 attached to a pin at the free end of the lever, which said pin also pivotally connects the lever 56 to link 61. The opposite end of this link is attached by means of pin 62 to the elongated cam 50. When the follower 58 slips into either of the recesses 63 or 64 under action of the spring 59, the elongated cam or inclined plane 50 will be pulled against the rest 65, Figs. 2 and 15. The accurate positioning of this rest, which is appropriately attached to the base 8, makes the position of the elongated cam 50, when it is in contact with this rest, independent of any inaccuracies in the cam 52.

The position of the cam-lever 50 shown in full lines is the active or operative position of this member. Instrumentalities mounted on the carriage 1 cooperate with this cam lever 50 and move the frame 11 from a central position to the required lower position upon movement of the carriage from its shielded position at the right of the housing to a position at the left where at least a portion of the film in the cassette will be within the spread of the X-rays.

It might here be mentioned that when full views are not being taken, that the portion of the film not to be exposed and any portion that may previously have been exposed are shielded from the rays. Such shielding is effected in two different ways—first, by the usual shutter or diaphrams that control the spread of the X-rays after they emerge from the X-ray tube housing, and second, by the customary lead masking that is placed on the underside of the spot film device when such masking is required. If an upper and lower half of the film are to be successively exposed, and if the size of the film is 8″ x 10″, all primary and secondary radiation must be masked off excepting for an area 4 inches wide from top to bottom. This unmasked area must be centrally and symmetrically arranged with respect to the screen. If the aperture in the mask is 4″ x 10″, this area will take care of the situation regardless of whether the film is disposed horizontally or vertically, as it is immaterial if there are unmasked regions beyond the edge of the film, the necessary requirement being that the previously exposed or unexposed areas be protected by the lead masking. Such masking is customarily provided by wafers that move in grooves or tracks usually arranged on the underside of the spot film device. However, since such masking or tracks per se form no portion of the present invention, they are neither illustrated nor further described herein.

When the cassette frame 11 is in the central position within the cariage while the carriage is in the home position, the said frame 11 will be locked in the carriage by means of a pin or plunger 66, the tapered forward end of which will then be disposed within an opening 67, Figs. 4, 15 and 16. Before the frame 11 can be moved downward, it is necessary for this pin 66 to be retracted from the hole or aperture 67. This is done by means of associated apparatus which will now be described.

The plunger 66 is provided on one side with gear teeth 68 that mesh with a pinion gear 69 rigidly attached to a short shaft 70 appropriately journaled in the carriage frame. A second gear 71, preferably of larger diameter, is rigidly mounted on the upper end of shaft 70. A short rack 72, mounted on the longitudinally movable side plate 73 by appropriate means such as screws 74 and 75, meshes with the spur gear 71. An expansion spring 174 is attached by lug 175 to the movable side plate in the position illustrated in Fig. 15, and this spring, acting through the side plate 73, the rack 72, gear 71, shaft 70 and gear 69, normally holds the toothed plunger 66 in an outward position—with the tip of the plunger in one of the apertures in the side of the frame. When the frame is in its central position, this is aperture 67. Inasmuch as gear 69 is smaller than gear 71, the mechanical advantage thus obtained results in the plunger 66 being urged outwardly with a pressure greater than that directly obtained from the spring 174.

Figure 3:
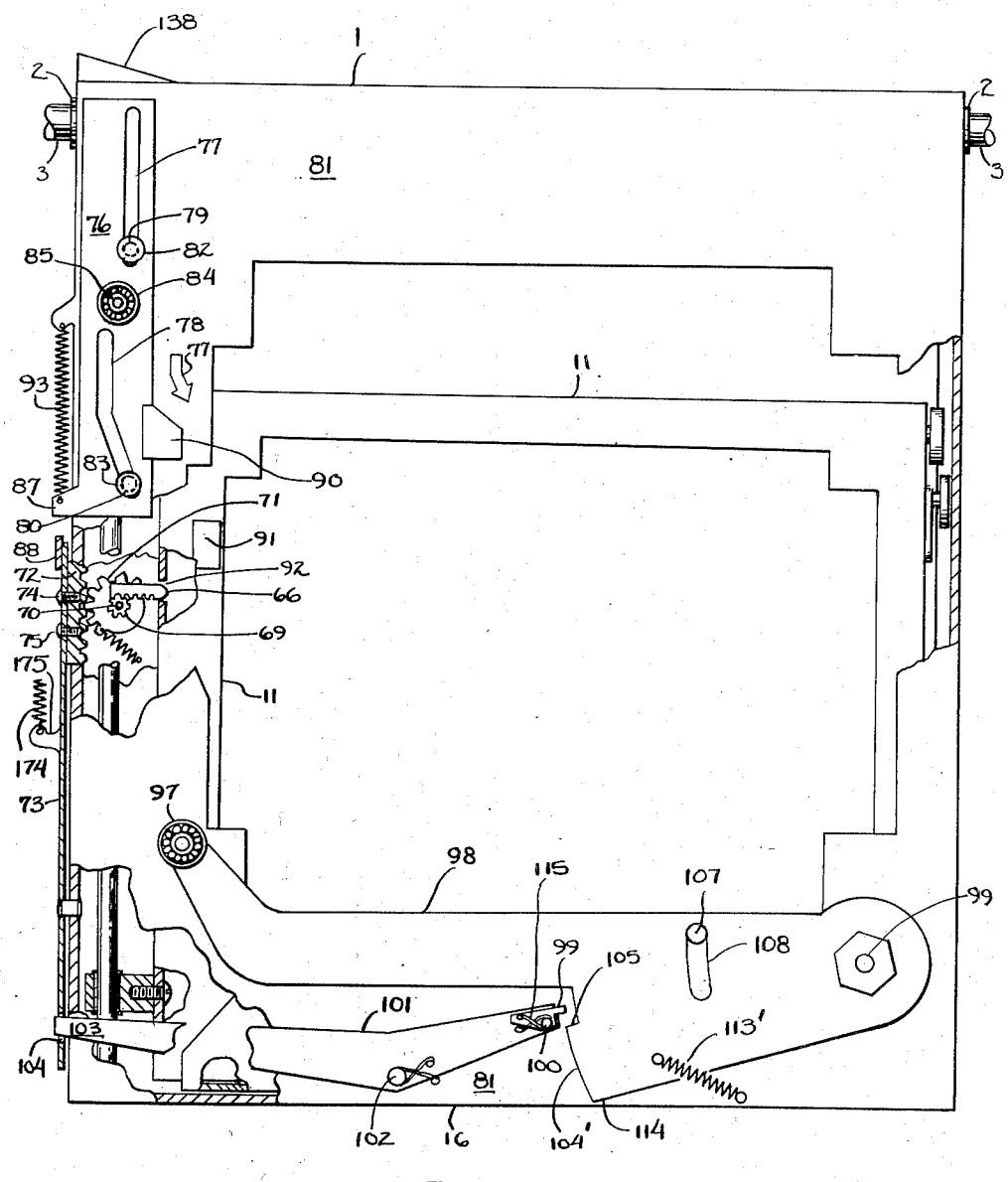
Fig. 3 is a rear view of the carriage and cassette-moving frame and the interconnected operating parts.

The plunger 66 is caused to move out of aperture 67 by the downward movement of the longitudinally movable plate 73 against the action of spring 174. This movement is effected by means of a plate 76, Figs. 15, 16 and 3, which is slidably mounted as shown in the last mentioned figure. The slidable plate 76 is provided with an upper slot 77 and a lower slot 78 through which pins 79 and 80 extend. These pins extend into suitable holes in the back of the carriage 1 and are peened over at their outer ends or otherwise appropriately attached to the back plate 81 of the carriage. The heads or peened-over portions 82 and 83 of pins or rivets 79 or 80 hold the slidable plate 76 against the back piece 81 of the carriage. A ball bearing 84 is appropriately mounted on plate 76 by any suitable means such as a stub shaft or rivet 85. In Fig. 15, various portions of the carriage 1 and frame 11 have been broken away in order to show a top or plan view of the plate 76 and the cooperation of ball bearing 84 on the underside thereof with the elongated cam 50. As the carriage 1, Fig. 15, moves toward the field in the direction indicated by arrow 86, the ball bearing 84 engages the elongated cam or inclined plane 50, and as this bearing proceeds along the edge of the cam as indicated in this figure, the plate 76 gradually moves down. Inasmuch as slot 78 is curved or angled as shown in Figs. 3, 15 and 16, this plate in its downward movement will proceed slightly toward the inside of the carriage as indicated by arrows 77, Figs. 3 and 15. After the plate 76 has moved only a short distance, an ear 87 on the lower end thereof will engage a dog 88, Figs. 1, 15 and 16. Dog 88 is pivotably mounted on the translationally movable side plate 73, and when the lower leg of this dog is engaged by the ear 87, it will be held against rotation by the stopping pin 89, Fig. 1. The continued downward movement of ear 87, pushing on the dog 88, causes the side plate 73 to move downward, taking the rack from the upper position shown in Fig. 15 to the lower position shown in Fig. 16. This movement of the rack turns the interconnected gears clockwise and moves the pin or plunger 66 out of the hole 67.

After this pin has thus released the frame 11, the dog 90 on the side of member 76 opposite from the ear 87 will engage the cooperating dog 91 attached to the underside of frame 11, as indicated in Figs. 3, 15, 16 and 17. After the frame 11 has been moved far enough to take the aperture 67 out of alignment with the plunger pin 66, the plate 76 will have moved far enough to the left, as viewed in Fig. 16, to cause the ear 87 to move to the side of dog 88, permitting the plate to return to its upper position under action of the spring 174. The carriage, however, will continue to move downward in response to the downward movement of the plate 76 as the ball bearing 84, rotatably attached thereto, proceeds along the inclined plane 50. When the ball bearing 84 has reached the left end of the inclined plane 50, the frame 11 will be pushed down to its lower position. The plunger 66, meanwhile, will be resting against the side of frame 11 in which aperture 67 is located; and when the frame has reached this final lower position, another aperture 92, Fig. 4, will be aligned with the plunger. The plunger will then be forced into aperture 92 in response to the tension of spring 174 acting through the various movable parts that are operatively interposed between this spring and the said plunger.

When the ball bearing 84 passes to the left beyond the left end of the inclined plane 50, the plate 76 will move upward to its rest position under action of the retaining spring 93, the lower end of which is attached to this sliding plate. During this upward movement, the upper edge of ear 87 will of course strike the leg of dog 88, causing it to move out of the way by counterclockwise rotation away from pin 89.

Figure 10:
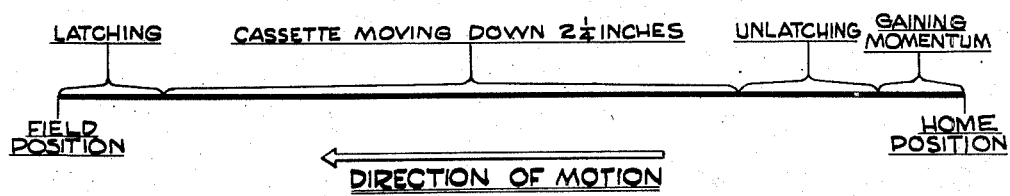
Fig. 10 is a diagram showing the sequence of operations that take place during the movement of the cassette carriage from the home or shielded position to the position in which at least a portion of the film is in the field of the X-rays.
Figure 12:
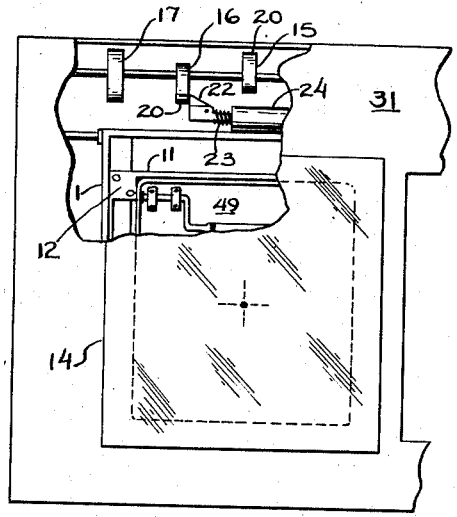
Fig. 12 shows the relationship of the cassette frame and cassette to the fluorescent screen when the entire film within the cassette is to be exposed.

When the cassette frame is moved downward, as the foregoing description of such movement indicated, the frame 11 is first unlatched, then moved downward, and then latched again in the lower position. It is advisable that the unlatching operation not begin until the carriage has gained a little momentum after leaving its shielded position. I consequently mount the lever-cam 50 in such a position with respect to the position that the ball bearing 84 occupies when the carriage is at the right end of my device, that the carriage must move a short distance, say ½ or 1 inch, before the ball bearing 84 engages the lever cam. The total movement of the carriage from its home position to a field position may therefore be divided into four periods, as indicated in Fig. 10, where the direction of movement is shown by an arrow. This figure shows a short portion of the journey devoted to the gaining of momentum, a somewhat longer portion for unlatching, the greater part of the leftward travel for the downward movement of the cassette frame, and a final portion for relatching the frame.

When my device is arranged for handling 8" x 10" cassettes disposed either vertically or horizontally within the cassette frame 11, I employ a downward travel of 2¼ inches from the central position. If the center of the upper half were to be positioned in exact alignment with the center of the screen, this movement should be 2 inches when the cassette is disposed horizontally in the frame and 2½ inches when the cassette is positioned vertically. In order to avoid the necessity of employing mechanism for two different distances of vertical travel, and for stopping the frame in two different low positions, I effect a compromise between the ideal shifts of 2 and 2½ inches respectively and provide for a single downward shift of 2¼ inches, as indicated in Fig. 10.

Figure 8:
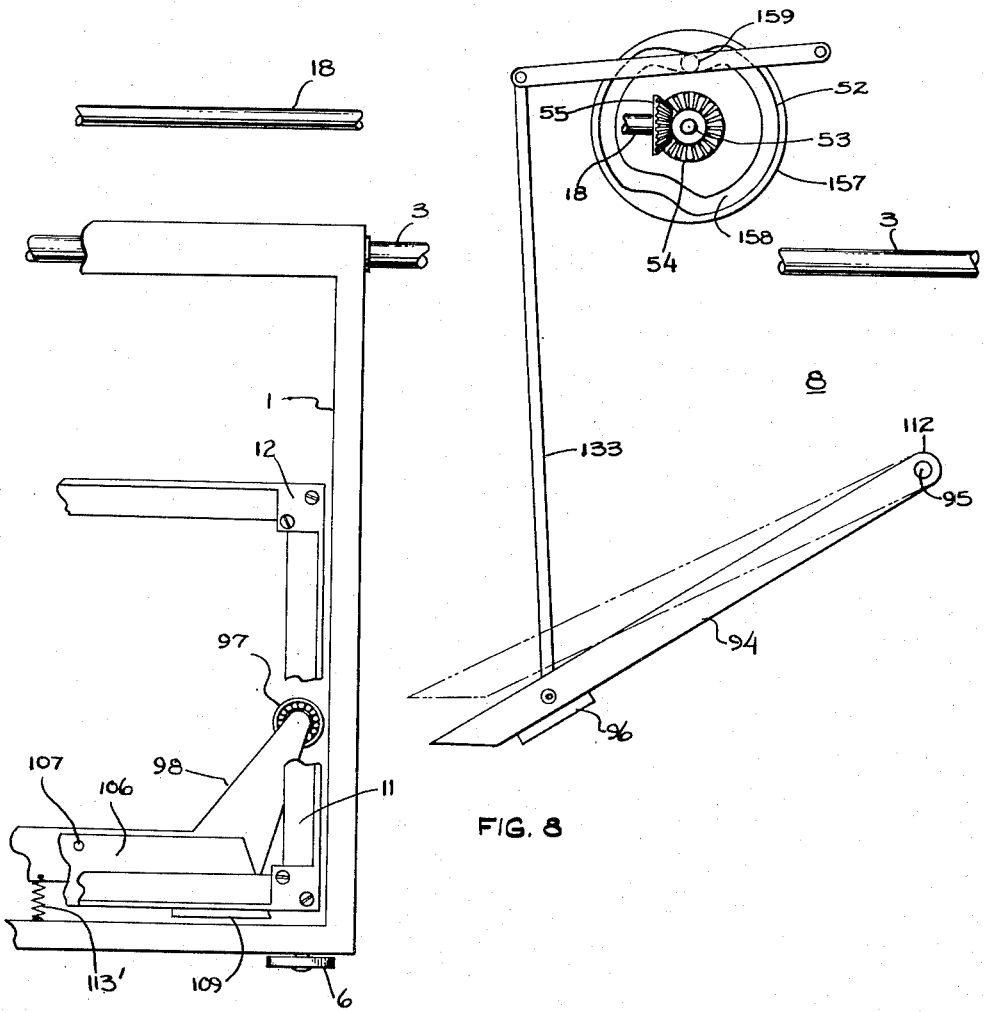
Fig. 8 illustrates an embodiment of my invention in which the position of the elongated cam or inclined plane is controlled by an internal cam.
Figure 11:
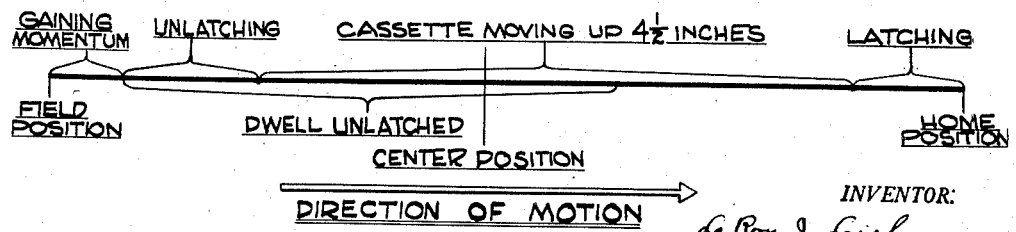
Fig. 11 is a diagram similar to that of Fig. 10, but illustrating the sequence of operations during the movement of the carriage from a position in which at least a portion of the film is exposed to the position in which the complete film is shielded from the X-rays.
Figure 9:
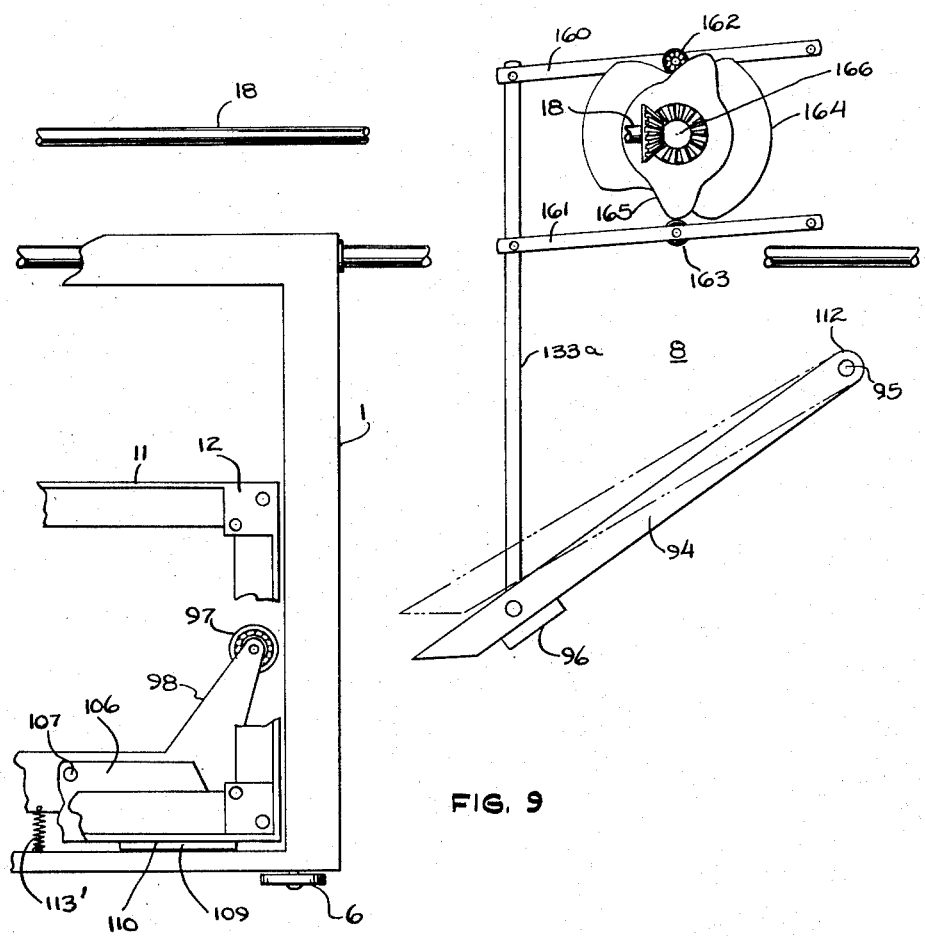
Fig. 9 illustrates the method of employing a pair of cams for operating such elongated cam or inclined plane.

The frame 11 is moved upward from its lowermost position, indicated in Fig. 9, to its uppermost position, shown in broken lines in Fig. 2, through the action of the lower inclined plane 94 and other interconnected parts mounted on the base 8 and upon the carriage 1. The inclined plane or elongated cam 94 is capable of occupying two positions, shown in broken and continuous lines respectively in Figs. 2, 8 and 9. This cam lever is pivoted to the base 8 by means of a stub shaft 95. The inclined plane or lever 94 is capable of being moved from one of these positions to the other by rotatable camming means which may be a peripheral cam of the type illustrated in Figs. 2 and 15 and previously described herein, or an internal cam such as that shown in Fig. 8, or a double male and female cam arrangement such as that pictured in Fig. 9.

For the purposes of illustrating the upward movement of the frame 11 during the travel of the carriage 1 from its field position to its shielded position at the right end of the housing wheel, let us first consider the interaction of the elongated cam 94 and the cooperating parts mounted on the carriage. The rotatable camming means that controls the positions of the cam lever 94 will be discussed afterward.

When the cam lever is in the lower position and resting against the stop 96 as shown in Fig. 8, it is engageable by ball bearing 97 rotatably mounted on the free end of a lever 98. This lever is pivoted by means of shaft 99 to the underside of carriage 1 at the lower left hand corner as shown in Fig. 2. The mounting of lever 98 is illustrated more clearly in the Fig. 3 view, which shows the underside of carriage 1 together with the parts that are mounted thereon. Lever 98 rotates as ball bearing 97 moves up the inclined plane 94 during the return of the carriage from a field position to the right end of the housing 4. The rotation of this lever from its lowermost position, indicated in Figs. 3 and 8, must first effect the unlocking of the frame 11 and then move the frame from its lowermost to its uppermost position within the carriage 1. The operation of the lock will probably be most easily understood by reference to Figs. 3, 4, 16 and 17. As the lever 98 moves up from the position indicated in Fig. 3, a shoulder 105 near the middle thereof engages the free end of a dog 99 pivotally mounted by a pin 100 on the short end of a lever 101 which is pivoted to the base 81 of the carriage 1 by means of a rivet or shoulder screw 102 or other appropriate mounting, as indicated in Fig. 3. As the dog 99 is pushed up by shoulder 105, the opposite end 103 of lever 101 moves down. This outer end of this lever extends into a recess 104 in the longitudinally movable plate 73, Figs. 3 and 4. As end 103 moves down, it consequently moves plate 73 with it. Through interconnected parts previously described, the downward movement of plate 73 moves the locking plunger 66 out of the latching hole 92 in the side of the frame, thus unlocking the frame so that it may be moved upward.

The upward movement of frame 11, after it has been unlocked, is effected by means of a second lever 106, Figs. 2, 8 and 9, which is rotatably mounted concentrically with lever 98 by means of the stub shaft or pivot 99. These two levers have a lost motion connection. A pin 107, integral with lever 106, passes through a slot 108 in lever 98, Figs. 2 and 3, in which the pin is free to slide. Because of this lost motion connection, it is possible for lever 98 to move upward sufficiently to cause the latching pin 66 to move out of the latching hole 92 in the frame 11 before the bottom of the slot 108 engages the lower side of pin 107. After such engagement has occurred, the further upward movement of lever 98 around the pivot 99 will cause the bottom of slot 108 to lift pin 107, thus moving lever 106 to which this pin is attached. The free end of lever 106 is provided with a flanged portion 109 which extends at right angles from the main body of this lever. When the frame 11 is in its lower position as shown in Figs. 8 and 9, the frame rests on this flange. The upward movement of the said flange consequently lifts the frame 11 from the position indicated in the fragmentary view of Figs. 8 and 9 to the position indicated in dotted lines in Fig. 2, where it will be observed that the flange 109 is still in contact with the lower edge 10 of the frame 11.

Inasmuch as the frame must move upward from its extreme lower to its extreme upper position, it is necessary that the locking or latching pin 66 be kept away from the latching apertures in the side of the frame 11 until the central latching hole 67 has moved beyond the plunger 66. If the longitudinally movable plate 73 which operates the latching pin 66 were held down only long enough to permit the hole 92, Figs. 3 and 4, to move beyond the latching pin, this latching pin would slip into the latching aperture 67 as the frame 11 in its upward movement passed the central position. It is therefore necessary that the pin be held in its retracted position until after the frame 11 has passed the center of the carriage. In order to keep this pin retracted, the side plate 73 is held down by means of the level 101, which is kept in its extreme counter-clockwise position (when looked at from the underside of the carriage) by means of the arcuate portion 104' of the lever 98. After the lever 98 has moved upward sufficiently far for the shoulder 105 to pass by the end of the dog 99, this dog will rest or dwell upon the arcuate surface 104', and the end 103 of lever 101 will thus be held down until the arcuate surface 104' has moved upward beyond the end of the dog 99. The restoring spring 174 will then move the longitudinally movable plate 73 to its upward or rest position, permitting lever 101 to return to its normal position shown in Fig. 3. The return of plate 73 toward its rest position under action of spring 174 causes the pin 66 to be urged outwardly through the intermediate rack and gear connections previously explained, and when the lower latching hole 111 in frame 11, Fig. 4, has moved upward far enough to be aligned with the plunger 66, this plunger will move into this hole and retain the frame 11 in its uppermost position.

The required upward movement of levers 98 and 106 will of course be effected by the movement of ball bearing 97 along the inclined plane or elongated cam 94 as the carriage 1 moves leftward. Although the uppermost position of levers 98 and 106 are shown in broken lines in Fig. 2 with the carriage in the field position, it will nevertheless be understood that these levers will not assume this position until bearing 97, during the movement of the carriage 1 to the right, has reached the top 112 of the lever 94. An arcuate member 113, Figs. 2 and 5, attached to the base 8, is arranged with one end adjacent the upper end 112 of lever 94 in such a manner that when the ball bearing 97 passes over the end 112, it will move down the convex side of member 113 during the last portion of the movement of the carriage toward its home position. For the sake of clarity, member 113 has been omitted from Figs. 8 and 9. Were this member omitted entirely from the device, the levers 98 and 106 would very rapidly return to their lowermost positions under action of spring 113', Figs. 3, 8 and 9, thus causing considerable jar and an objectionably loud noise.

As the lower edge 114 of lever 98 strikes the dog 99 during the downward movement of lever 98, the dog 99 will turn on its pivot 100, permitting the lever to pass by the outer end of this dog. After the lever 98 has returned to the lower position shown in Fig. 3, the dog 99 will return to the position shown in this figure due to the action of the hair spring 115.

It has previously been stated that the cassette will be automatically moved by the frame 11 to the successive positions required to make a series of exposures on fractional parts of the film in any of the several sequences that were previously set forth, and it was mentioned that a later portion of this specification would describe the automatic mechanism that makes these sequences possible. This mechanism will now be described in connection with the operation of the device for taking radiographs in any of these desired sequences or patterns.

If the radiologist desires to set the device so that it will take a single film-sized radiograph of what he may later see on the fluoroscopic screen, he turns the indicator 27, Figs. 1 and 5, to rectangle 116, Fig. 18. As previously explained, the shaft 28, to which indicator 27 is connected, is operatively connected by means of appropriate miter gears to shaft 18 which in turn is connected by miter gears 54 and 55 to the shaft 53 upon which the cam 52 is rigidly mounted. The position and coordination of these various interconnected parts is such that when the indicator 27 is turned toward the rectangle 116, the follower 58 of lever 56 will be engaged by a portion of the cam 52 having a maximum radius. This will cause the lever 56 carrying the follower 58 to be moved downward from the position shown in Figs. 2 and 15, thus causing lever 50 to be moved downward by the interconnecting link 61 from the full line position shown in these figures to the lower position shown in broken lines. When lever or cam 50 is thus disposed and when the sliding plate 76 is in its upward or rest position, the ball bearing 84 will be located above the free end of the cam-lever 50, it being assumed that the carriage 1 is in its shielded position at the right end of the housing 4.

If the fluoroscopist now observes a condition on the fluoroscopic screen that he desires to "capture" upon the film, he turn the main operating handle 118, Figs. 1 and 2, from the full line position to the dotted line position as seen in the latter figure. This handle is rigidly connected to a shaft 119 to which member 120 is also rigidly attached. A cord or cable 121 is connected to member 120 at point 122. Cord 121 passes over pulleys 123 and 124 and is then connected to a latch member 125. This latch is normally held in a downward position by the hair spring 126. Latch 125 abuts against the left edge of striker 127, Figs. 2 and 20, when the carriage 1 is in its home or shielded position, and the striker is held against the latch by the action of spring 128. When the fluoroscopist moves the handle from the full line to the broken line position shown in Fig. 2, member 120 will of course turn angularly with the handle 118 and the interconnecting shaft 119, with the result that the cord 121, attached to member 120, will be pulled. This cord will then move latch 125 upward beyond the end of the strike 127, thus permitting the carriage 1 to move to the left under action of the expansion spring 128.

The position at which the carriage will stop is of course determined by the angular position of the abutments on shaft 18. When the indicator 27 is aligned with rectangle 116 on the dial, the angular position of the abutments will be such that projection 20 of abutment 16 will intercept member 22, thus stopping the carriage 1 in its central position. During this leftward movement of the carriage, frame 11 will not have moved downward from its central position in which it was initially located in the carriage, for the reason that since the cam-lever 50 was in its downward position, shown in full lines in the various figures, there was no engagement between the elongated cam or inclined plane 50 and the ball bearing 84, which effects such downward movement of the frame. After the exposure has been made (through instrumentalities that are neither shown nor described herein for the reason that they form no part of this invention per se), the operator grasps the knob 129 attached to the carriage 1 as shown in Figs. 1 and 5, and moves it to the right, thus returning the carriage to the rest position shown in Fig. 20. As the carriage is approaching this home position, the strike 127 on the upper left corner of the carriage will engage the under sloping side of the latch 125 and thus move the latch upward sufficiently to permit the strike to pass by the end of the latch. The latch will then move down under action of the hair spring 126 so that the free end of the latch will engage the left edge of the strike and thus hold the carriage in its home position against the stored energy in spring 128.

The shank of knob 129 extends through a slot 130 in the housing 4, as shown in Fig. 5.

During the movement of the carriage 1 from its rest position toward the central field position for the making of the exposure just mentioned, the cam-lever 94 will be in the full line position shown in Fig. 8. The position of this cam-lever is controlled by a second rotatable cam 117, mounted rigidly on shaft 53 adjacent to the cam 52. When the indicator 27 is turned toward the index rectangle 116, the angular position of cam 117 will be such that the follower 131 on lever 132 will rest on a portion of the periphery of cam 117 having the maximum radius. This will result in the follower 131 being at a maximum distance from shaft 53, and lever 132 will consequently hold the interconnecting link 133 in such position that the inclined plane 94, pivotably attached to the lower end of this length, will be in the full line position shown in Fig. 2. The spring 134, attached to lower end of link 133, will pull downward on this link and maintain the follower 131 in contact with the periphery of cam 117. While the cam lever 94 is in the upward position shown in full lines in Fig. 2, the ball bearing 97 that operates lever 98 will lie below the outer end of this cam lever, with the result that there will be no engagement between ball bearing 97 and this lever while this ball bearing passes by this lever or inclined plane during the movement of the carriage.

Now let us suppose that the fluoroscopist desires to take two radiographs on the same film, one above the other. In this case he turns the indicator 27 to the index square 135 on the dial. This causes shaft 53 to be turned to the angular position indicated in Figs. 2 and 19, and cam 52 will consequently permit the follower 58 on lever 56 to be drawn into peripheral recess 63 in this cam under action of the spring 59. Link 61, which is pivotally interconnected between lever 56 and the inclined plane 50, will then pull this inclined plane against the rest 65. When the fluoroscopist is ready to make the first of the two desired exposures, he releases the latch 125 by the operation of the handle 118, as hereinbefore described. During the ensuing movement of the carriage 1 toward the field position, the frame 11 will be moved from its central home position toward its lowermost position within the carriage, as a result of the engagement of ball bearing 84 with the lower surface of the inclined plane 50. The sliding plate 76 will move downward as ball bearing 84 rolls along the edge of the inclined plane, causing the instrumentalities that are operatively interposed between this plate and the frame 11 to effect the downward movement of his frame and such cassette as may be nesting therein.

Figure 19 shows the relative angular positions of the indicator dial 27, cams 52 and 117, the rotatable abutments 15 and 16, and a ratchet wheel 137 during the operation just described. This ratchet wheel cooperates with the pawl 138 in the upper right hand corner of the carriage 1, Figs. 1 and 2. When the carriage is moved home by means of the knob 129, Figs. 1 and 5, after the aforementioned exposure of the upper portion of the film, pawl 138 will engage tooth 139 of the ratchet wheel 137. This will cause the ratchet wheel to rotate counterclockwise to a position determined by the detent 140, Figs. 1 and 2. The positions in which the detent yieldably indexes the shaft are approximately 40° apart—inasmuch as nine different steps are provided for on the dial. The movement of the ratchet from the position indicated in Figs. 2 and 19, advances all of the rotatable parts interconnected with the ratchet wheel from the second indexing position to the third. As will appear from an inspection of Figs. 2 and 19, this orients cams 52 and 117 to such positions that lever 56 and link 61 will move the upper inclined plane 50 downward from the full line position shown in Figs. 2 and 15 to the broken line positions shown in these figures, thus removing this inclined plane from all possible engagement with the ball bearing 84 that controls the downward movement of the frame 11 and such cassette as may be positioned therein.

During the movement of the ratchet wheel just described, the shaft 18 and all other rotatable parts that are operatively connected with the ratchet will also be advanced. Accordingly, the pointer 27 will move from the angular position in which it points to the square 135 to a position in which it will point to square 148. This will immediately indicate to anyone glancing at the dial that the next exposure will be of the bottom half of the film, the lower portion of the index square 148 being appropriately colored to convey this information.

It will be apparent from Figs. 2 and 19 that the angular position of cam 117 will now be such that the protruding follower 131 on lever 132 will move into recess 141 under action of spring 134. This will cause the elongated cam 94 to rest against the stop 96 which is rigidly attached to the base 8. The position of inclined plane 94 is thus determined by stop 96 rather than by cam 117, the depth of recess 141 and the length of link 133 being such that the follower 131 on lever 132 does not rest on the bottom of the recess 141. The follower 131 thus rides the portions of cam 117 having a maximum radius and there is no actual engagement between the follower 131 and the cam when the follower is brought within the recess 141. The follower 58 on lever 56 is arranged in similar manner with respect to cam 52. As a result of these arrangements, the force exerted by ball bearings 97 and 84 on the inclined planes with which they respectively cooperate, is borne by blocks 65 and 96, and none of it is carried by the cams.

With the inclined plane 94 in the lower position in which it has now been placed by the action of pawl 138 on the ratchet wheel 137, the outer tip of this plane 94 lies below the normal rectilinear path of ball bearing 97. As a result, ball bearing 97 will engage the lower end of the inclined plane 94; and the instrumentalities operatively connected with lever 98, which carries ball bearing 97, will first unlock the frame 11 and then move it to its upper position as the carriage 1 is returned from its field position to the home position at the right end of the frame 4. When the carriage next moves into the field, the position of frame 11 will consequently be such that the center of the lower half of the cassette will coincide with the central X-ray beam for the ensuing exposure.

During the next movement of the carriage 1 toward its home position, after the exposure of the lower half, there will be no engagement between the pawl 138 and the ratchet wheel, for the reason that none of the five teeth of this wheel will be so located that such engagement can occur. (It will be noted that while there are nine possible different angular positions for the ratchet wheel and all the rotatable members operatively connected thereto, there are only five teeth on the ratchet wheel. There are thus only five positions from which the ratchet wheel may be advanced during the movement of the carriage from left to right.) In view of the fact that the ratchet wheel and the associated rotatable cams will thus not be advanced after the bottom half of the film has been exposed, the elongated cam 94 will remain in its lower position against rest 96. When the carriage 1 returns to its home position after this exposure, the ball bearing 97 will engage the inclined plane 94, and levers 98 and 106 will consequently move up and go through the same cycle of operations through which they went in raising the frame 11 from its lowermost to its uppermost position. However, since the frame 11 is already in this upper position, nothing will occur excepting that the two levers 98 and 106 will move up and down.

After the upper and lower halves of the film have been exposed and the carriage has returned to its home position, the frame 11 will remain in its upper position within the carriage. If the opening 13 through which the cassettes are passed when placing them in the frame 11 or removing them therefrom, is not sufficiently long (from the upper edge 144 to the lower edge 145, Fig. 2) the frame 11 must be moved down from its upper to its central position for removal. It is of course necessary that the frame be unlocked before such movement can take place. This unlocking may be accomplished through the instrumentality of plate 73 to which plate 142, Fig. 1, is attached at right angles thereto. Plate 73, it will be remembered, is the plate that operates the unlatching mechanism. The fluoroscopist or technician, by placing his finger in the opening 147 in plate 146, which is attached to plate 73, may move plate 73 down; and while holding it there to keep the frame unlatched, he can readily remove the cassette.

Automatic means may be provided for unlatching the frame and moving it down and for ejecting the cassette from the frame, but inasmuch as such mechanism is not a part of this invention per se, it has been omitted from the figures and from the description for the sake of clarity and simplicity.

Now let us suppose that the fluoroscopist wants to take a right and left half. He will of course load the cassette in the frame while the latter is disposed centrally within the carriage, and he will move the pointer 27 to rectangle 149 on the dial. As will be observed in Fig. 19, this will cause all rotatable parts operatively connected with the indicator 27 to be moved to such positions that the rotatable cams 52 and 117 will place the followers 58 and 131 respectively on portions of their associated cams that have a maximum radius. The cam-lever 56 will consequently be moved from its operative position against stopper 65 to its non-operative position in which the ball bearing 84 will pass over it; and the cam lever 94 will be so positioned that the ball bearing 97 will pass under it. As a consequence, when handle 118 is moved from the position shown in full lines in Fig. 2 to the position indicated in broken lines, thus unlatching the carriage 1, the latter will proceed toward the field position without moving either up or down. Its motion will be stopped by abutment 15, as the initial setting of dial 27 will have turned this abutment to an angular position in which one of its projections 20 will lie in the path of member 22 of the dash-pot assembly.

After exposure of the left half of the film, the operator will of course return the carriage to its home position by means of the knob 129. During the return of the carriage, however, the pawl 138 will engage tooth 150 of the ratchet wheel, causing this wheel and all the interconnecting rotary parts to be advanced one position. Indicator 27 will consequently now point to rectangle 151 on the dial. The right half of this rectangle is colored in a manner to indicate that the next portion exposed will be the right half of the film. The angular position of cams 52 and 117, although changed, will still be such that followers 58 and 117 will continue to ride peripheral portions of these cams having maximum radii, and there will consequently be no movement of the elongated cams 50 and 94 from the positions hereinbefore last mentioned. The rotation of shaft 18, however, will move abutment 15 to such an angular position that projection 20 will no longer be in the path of member 22. Projection 20 of abutment 16 will also be outside the path of member 22. A situation will thus have been created in which the carriage 1, upon its next movement from its rest position to a field position, will be stopped by the engagement of member 22 with the last abutment 17. This centers the right half of the film with the center of the screen for the last of the two exposures.

When the carriage is returned to its home position, after the right half of the film has been exposed, the pawl 138 will encounter no teeth on the ratchet wheel and it accordingly will not be advanced. The fluoroscopist or technician will then remove the cassette from the frame 11.

When exposing any fractional part of a film, it is of course necessary to protect any previously exposed, or later-to-be-exposed, portions with appropriate lead masking. This is usually provided in connection with a compression cone customarily attached to the underside of the spot-film device. An alternative arrangement is a lead mask slidably mounted on the underside of the tunnel so that it may be moved in and out of the field. Such a mask has a central opening whose dimensions correspond with that of the area of film that is to be exposed. Neither the compression cone nor lead mask is further described here, nor are they shown in the drawings, because they form no part of the present invention per se.

If four quarters of a film are to be exposed, the radiologist will turn the dial 27 to rectangle 152 on the dial. He will also arrange an appropriate lead mask on the back of the spot film device under the frame 4 so that the X-rays will not extend beyond an area 4" x 5" symmetrically arranged with respect to the center of the screen, which will of course also be aligned with the central X-ray beam. The rotation of the knob 27 into alignment with the index rectangle 152 will place notch 64 of cam 52 in a registered position with respect to follower 58 of lever 56, with the result that inclined plane 50 will be drawn into its active position against stopper 65. The angular position of abutment 15 will be such that a projecting portion 20 thereon will come into the path of member 22. Accordingly, when handle 118 is actuated to bring the cassette into the field, the ball bearing 84 on the slide plate 76 will engage inclined plane 50, and as plate 76 moves downward in response to the movement of ball bearing 84 along the inclined plane, the frame 11 will be moved from its central to its lower position by means of the various parts operatively associated with plate 76. The carriage will stop in a position determined by the engagement of member 22 with one of the projections 20 of the rotatable abutment 15. The particular vertical and lateral positioning of the frame will thus be such that the center of the upper left hand quarter of the cassette will be aligned with the center of the screen.

After the exposure has been made, the pawl 138 will engage a tooth on the ratchet wheel, thus rotating the shafts to such a position that indicator 27 will point to rectangle 154, showing that the next position to be exposed will be the second quarter of the film; and the projecting portions 20 of both abutments 15 and 16 will be turned to positions outside the path of member 22 of the plunger assembly. Therefore, when lever 118 is operated to bring the carriage back into the field, the carriage will move until member 22 strikes the last abutment 17. The frame 11 will of course have remained in its lower position, and the center of the upper right hand corner will consequently be symmetrically aligned with the center of the screen.

Following the exposure of the second quarter, the return of the carriage to its home position will again cause the ratchet wheel to be advanced, and abutment 15 will be brought into the path of member 22. This happens before member 22, in its movement to the right, has passed abutment 15; but inasmuch as this member is pivotally carried on member 21, and spring-loaded outwardly, it is cammed out of the way and readily passes the abutment. After the stepped advancement of the ratchet wheel, the angular position of cams 52 and 117 will be such that the upper inclined plane 50 will remain in the same downward position in which it was disposed when the carriage came into the field to expose the second quarter. The bottom inclined plane 94 will have been lowered in response to the movement of the ratchet wheel immediately after the carriage started to return to its home position following the exposure of the second quarter, and this lower inclined plane will consequently be at rest against abutment 96 before the ball bearing 97 reaches it. The various interconnected parts will then come into play and will move the frame 11 from the lowermost position to its uppermost position in the manner previously described. The pointer 27 will now have advanced to rectangle 155, indicating that the third quarter will next be exposed, and the angular position of abutment 15 will be such that one of the projecting portions 20 will be in the path of member 22. Consequently, when lever 118 is actuated in order to bring the carriage 1 into the field for making the next exposure, it will be the lower left hand quarter of the film that will be centrally positioned behind the screen.

After this third quarter has been exposed, the movement of the carriage through the first portion of its homeward journey will cause pawl 138 again to advance the ratchet wheel, and the situation will then be such that the indicator 27 will point to the index rectangle 156. Follower 131 will remain on a non-indented portion of cam 117, leaving inclined plane 94 in its lower position. Levers 98 and 106 will consequently be actuated; but since frame 11 will already be in its upper position, the movement of these levers will be a useless but harmless operation. When the carriage is next brought into the field, the projections on abutments 15 and 16 will both be out of the way, and the carriage will therefore be stopped by the engagement of member 22 with the last abutment 17. The lower left hand quarter of the film will as a consequence come into alignment with the central ray. When the carriage is next returned to its home position there will be no further advancement of the ratchet wheel, as the sequence of four exposures will have been completed. The cassette may then be removed from the frame 11 at the desire of the operator.

In the foregoing descriptions of the cooperation of followers 58 and 131 with the cams with which they are respectively associated, it was mentioned that these followers were brought into the notches of these cams by springs 59 and 134. While these springs keep these followers in contact with the cams, they of course add a load to the cams which makes the shaft 18 slightly harder to turn than would otherwise be the case. I therefore contemplate two alternative arrangements for eliminating such spring loading. The two cams that respectively control the positions of inclined planes 50 and 94 may be internal cams such as cam 157, Fig. 8. This cam has a groove 158 therein which receives and guides the follower 159, thus eliminating the necessity of a loading spring. A similar internal cam may be used to control the position of lever 94.

Another alternative arrangement for operating the inclined planes or elongated cams, contemplates the use of two peripheral cams for controlling each of the inclined planes. Such an arrangement is shown in Fig. 9, where two follower-supporting levers 160 and 161 are pivoted to the connecting link 133a, which serves the same purpose as link 133 in the embodiment shown in Fig. 2. Lever 160 rotatably carries a ball bearing follower 162 which cooperates with cam 164, and lever 161 similarly carries a follower 163 that cooperates with cam 165. These two followers are so disposed that a line connecting their centers of rotation passes substantially through the axis 166 of the cams, and the contour of the cams is such that the indentations on one are 180 degrees from the cooperating projections on the other. These indentions and projections are thus so arranged that the followers 162 and 163 are always kept in contact with the peripheries of their respectively associated cams. This relationship requires that the distance from the point of engagement of follower 162 with cam 164 to the point of engagement of follower 163 with cam 165, remain substantially constant so that there is no appreciable play or lost motion in the assembly. As shaft 18 rotates, causing cams 164 and 165 also to turn, the levers 160 and 161 will operate in such a manner that link 133a will move inclined plane 94 up and down and hold it in any position in which it may be disposed by the said cams. It will of course be understood that similar cams, which might appropriately be called male and female cams, may be employed for actuating such other inclined plane as the spot film device may require.

In addition to the arrangements in which a single cam or double cam operates each of the inclined planes or elongated camming means, I contemplate the use of another embodiment of my invention in which a single cam operates both of these. This arrangement is shown in Figs. 21, 22 and 23. Fig. 21 shows the positions of various components at a time in the cycle of operations that corresponds with the interval in which the parts in previously described embodiments are in the positions illustrated in Figs. 1, 8 and 9. The lower inclined plane is accordingly shown in operative position, and the figure also shows the corresponding angular position of the rotatable cam 181. Fig. 22 illustrates the positions of the various components at another time in the cycle of operations, this interval corresponding to that in the cycle of operation of another embodiment when the parts are disposed as shown in Fig. 15.

It will be noted in Figs. 21, 22 and 23 that the cam 181 has a periphery on which the ball bearing follower 182 may dwell on any of three different levels, these levels, of course, having three different radii. In Fig. 21 the follower 182 is in a depression 183 in the cam, this depression having the shortest radii of the three dwelling portions of the periphery. Accordingly, the low position of the follower 182 permits the link 184 to position the pivotally connected lower inclined plane 94d against the lower rest or abutment 96d, against which the lower inclined plane or cam lever 94d is held by the action of spring 134d.

Fig. 22 shows the upper inclined lever 50d (corresponding to the upper inclined plane 50 of previous embodiments) in the operative upper position against the rest or abutment 65d. It will be noted that the ball bearing follower 182 is now on a dwelling portion of the cam having the longest radius. The camming plane or lever 50d is held against the rest 65d by the torsion spring 185. When this plane is in this position, the ball bearing 84d (corresponding to ball bearing 84 of the previous embodiments, and which actuates the previously described sliding plate 76) will engage the inclined plane in the manner set forth in the description of previous figures.

In certain sequences of the operation of the spot film device, the carriage will move from a field position to its rest position at the right end of the housing during the time that lever 50d is in the upper position shown in Fig. 22. In the beginning of such return movement of the ball bearing 84d, it will be in substantially the position shown at 84e in Fig. 22. In returning to the rest position shown at 84d, it will consequently strike the inclined plane 50d. Were the connection between link 184 and the plane 50d a mere pivotal connection, such engagement of the ball bearing 84d with the top surface of this inclined plane would cause a jamming action, because the ball bearing could not push the inclined plane out of the way. The ball bearing 182 is in engagement with the widest portion of the cam 181, and the lever 132 (on which this ball bearing is mounted) is consequently held in the uppermost of its possible positions. Inasmuch as link 184 is pivotally attached to lever 132, this link is likewise held in its uppermost position; and were the connection of this link with the inclined plane also a pivotal connection, the inclined plane would likewise be held in the position shown in Fig. 22, and it consequently would not move down upon the engagement of ball bearing 84d with its top surface. To avoid such jamming action, I provide a slot 186 in the inclined plane or lever 50d so that this inclined plane may be pushed down out of the way of the ball bearing 84d in its leftward movement. When this ball bearing follower has moved laterally to a position beyond the inclined plane or cam-lever 50d, the lever will return to rest against the stopping abutment 65d under action of the spring 183, which pulls on member 197 attached to the under side of lever 50d.

In Fig. 21, inclined plane 50d has been pushed down to its lowest possible position by the stud 187 carried by link 184. This stud pushes against the lower end of slot 186.

When the upper inclined plane 50d and the lower inclined plane 94d are both to be out of engagement with the ball bearings with which they respectively cooperate, these inclined planes will be in the intermediate positions shown in full lines in Fig. 23. This intermediate positioning is brought about by the angular position of cam 181 which now presents a peripheral dwelling portion of intermediate radius to the ball bearing follower 182. The camming lever 94d has a pivotal connection, as previously explained, with link 184, and this camming lever is therefore held in the intermediate position by spring 134d which pulls downward to maintain the ball bearing follower 182 against cam 181, thus holding link 184 in the position indicated in Fig. 23. The inclined plane 50d is likewise held in the central position by the action of link 184 and pin 187, this pin being in contact with the lower edge of slot 186 due to the action of the spring 185, as previously explained.

The profile of cam 181 is so arranged that the inclined planes will come into operative position at precisely the timed intervals previously described in connection with embodiments already discussed; and when this cam is connected to the ratchet wheel and various gears shown in other figures, the same sequences of automatic operations will take place that have previously been set forth.

The embodiments of my invention hereinbefore set forth are only illustrative; and my invention, as well as the sub-combinations thereof, may be embodied in many other forms. Various parts may be omitted and replaced by other parts that perform the same functions without departing from the broad spirit of my invention as succinctly set forth in the appended claims.

My claims are:

1. In a device for moving cassettes into and out of an X-ray beam, a carriage for receiving and supporting a cassette; guiding means for said carriage; a rotatable shaft disposed generally parallel to the direction of movement of said carriage; an abutment supported on said carriage and extending toward said shaft; projections on said shaft spaced both angularly and axially and extending, in certain angular positions of said shaft, into the path of said abutment; and indicating means positively connected to said shaft to show which projection is in position to stop the carriage by intercepting said abutment.

2. In a device for moving cassettes into and out of an X-ray beam, a carriage for receiving a cassette and supporting it for translational movement in a first direction; means for guiding and constraining said carriage to move in a second direction; selectively operable means for moving said cassette in said first direction while said carriage is moving in said second direction; means for controlling the selective operation of said selectively operable means, said control means comprising (a) a rotatable cam, (b) a follower for said cam, and (c) means connecting said follower and said selectively operable means; and indicating means positively connected to said cam to show whether the aforementioned components of said control means are in the proper operating position to effect the selective operation of said cassette-moving means.

3. In a device for moving cassettes into and out of an X-ray beam, a carriage for receiving a cassette and supporting it for translational movement in a first direction; means for guiding and constraining said carriage to move in a second direction; selectively operable means for moving said cassette in said first direction while said carriage is moving in said second direction; means for controlling the selective operation of said selectively operable means, said control means comprising (a) a rotatable cam, (b) a follower for said cam, and (c) means connecting said follower and said selectively operable means; a rotatable shaft disposed generally parallel to the direction of movement of said carriage, said shaft having a positive operating connection to said cam; an abutment supported on said carriage and extending toward said shaft; projections on said shaft spaced both angularly and axially and extending, in certain angular positions of said shaft, into the path of said abutment; and indicating means positively connected to said shaft to show (a) the angular position of said projection with respect to said abutment and (b) whether the cam is so disposed that it will effect the operation of said cassette moving means.

4. In a device for moving cassettes relative to an X-ray beam, a carriage for receiving and supporting the cassette; guiding means for said carriage; a rotatable shaft disposed generally parallel to the direction of movement of said carriage; a dash-pot on said carriage; an abutment rigidly supported on the plunger of said dash-pot, said abutment extending toward said shaft; projections on said shaft spaced both angularly and axially and extending, in certain angular positions of said shaft, into the path of said abutment; and indicating means positively connected to said shaft to show which projection is in position to stop the carriage by intercepting said abutment.

5. In a device for moving cassettes relative to an X-ray beam, a carriage for receiving and supporting a cassette; means for guiding the movement of said carriage in at least one predetermined path; a dash-pot on said carriage; a first abutment rigidly supported on the plunger of said dash-pot; and a second abutment positioned at least part of the time in the path of said first abutment; said dash-pot acting to bring said carriage to a gradual stop in response to the engagement of said abutments.

6. In a spot film device, a carriage for supporting a cassette and transporting it between a shielded position outside the X-ray beam and an exposable position in which the cassette is at least partially within the beam; and means for moving the supported cassette in a direction transverse to the direction of movement of the carriage, said means including (a) an elongated member disposed generally at an angle to the direction of movement of said carriage, (b) a follower operatively interposed between said member and said cassette and acting upon movement of said carriage to engage said member and move said cassette in a direction transverse to the direction of movement of said carriage, and (c) means for yieldingly holding said follower in contact with said member.

7. In a spot film device, a carriage for supporting a cassette and transporting it between a shielded position outside the X-ray beam and an exposable position in which the cassette is at least partially within the beam; instrumentalities for moving the supported cassette in a direction transverse to the direction of movement of the carriage, said instrumentalities including (a) elongated camming means disposed generally at an angle to the direction of movement of said carriage, said camming means comprising an element that is movable from a first position to a second position, (b) a follower operatively interposed between said camming means and said cassette and acting when said element is in said first position to engage and traverse said camming means upon movement of said carriage and to move said cassette in a direction transverse to the direction of movement of said carriage, and (c) means for yieldingly holding said follower in contact with said camming means during said follower's traversal thereof; and selectively operable means for moving said element from said first position in which it is engageable by said follower to said second position where it is not thus engageable.

8. In a spot film device, a carriage for supporting a cassette and transporting it between a shielded position outside the X-ray beam and an exposable position in which the cassette is at least partially within the beam; instrumentalities for moving the supported cassette in a direction transverse to the direction of movement of the carriage, said instrumentalities including (a) elongated camming means disposed generally at an angle to the direction of movement of said carriage, said camming means comprising an element that is movable from a first position to a second position, (b) a first follower operatively interposed between said camming means and said cassette and acting when said element is in said first position to engage and traverse said camming means upon movement of said carriage and to move said cassette in a direction transverse to the direction of movement of said carriage, and (c) means for yieldingly holding said first follower in contact with said camming means during said first follower's traversal thereof; and selectively operable means for moving said element from said first position in which it is engageable by said first follower to said second position where it is not thus engageable, said selectively operable means comprising a rotatable cam, a second follower engaging said cam, and a link connecting said second follower and said element, said link acting upon rotation of said cam between certain angular positions thereof to move said element from one of its recited positions to the other.

9. In a spot film device, a carriage for supporting a cassette and transporting it between a shielded position outside the X-ray beam and an exposable position in which the cassette is at least partially within the beam; instrumentalities for moving the supported cassette in a direction transverse to the direction of movement of the carriage, said instrumentalities including (a) elongated camming means disposed generally at an angle to the direction of movement of said carriage, said camming means comprising an element that is movable from a first position to a second position, (b) a first follower operatively interposed between said camming means and said cassette and acting when said element is in said first position to engage and traverse said camming means upon movement of said carriage and to move said cassette in a direction transverse to the direction of movement of said carriage, and (c) means for yieldingly holding said first follower in contact with said camming means during said first follower's traversal thereof; selectively operable means for moving said element from said first position in which it is engageable by said first follower to said second position where it is not thus engageable, said selectively operable means comprising a rotatable cam, a second follower positioned to engage said rotatable cam, and a link connecting said second follower and said element, said link acting upon rotation of said cam between certain angular positions thereof to move said element from one of its recited positions to the other; and indicating means having a positive operating connection with said cam to show the concurrent operating positions of the movable components controlled thereby.

10. In a spot film device, a carriage for supporting a cassette and transporting it between a shielded position outside the X-ray beam and an exposable position in which the cassette is at least partially within the beam; instrumentalities for moving the supported cassette in a direction transverse to the direction of movement of the carriage, said instrumentalities including (a) elongated camming means disposed generally at an angle to the direction of movement of said carriage, said camming means comprising an element that is movable from a first position to a second position, (b) a first follower operatively interposed between said camming means and said cassette and acting when said element is in said first position to engage and traverse said camming means upon movement of said carriage and to move said cassette in a direction transverse to the direction of movement of said carriage, and (c) means for yieldingly holding said first follower in contact with said camming means during said first follower's traversal thereof; and selectively operable means for moving said element from said first position in which it is engageable by said first follower to said second position where it is not thus engageable; said selectively operable means comprising (a) a second follower, (b) a cam presenting an unbroken surface to said second follower, said surface varying in its distance from the axis of said cam, (c) means for keeping said second follower in continuous engagement with said surface, and (d) a link connecting said second follower and said element, said link acting upon movement of said second follower in response to the rotation of said cam to move said element from one of its recited positions to the other.

11. In a spot film device, a carriage for supporting a cassette and transporting it between a shielded position outside the X-ray beam and an exposable position in which the cassette is at least partially within the beam; guiding means for said carriage; a rotatable shaft disposed generally parallel to the direction of movement of said carriage; an abutment supported on said carriage and extending toward said shaft; projections on said shaft spaced both angularly and axially thereof and extending, in certain angular positions of said shaft, into the path of said abutment, said projections each acting to intercept said abutment and stop the movement of said carriage in a position corresponding to the axial position of the projection; instrumentalities for moving the supported cassette in a direction transverse to the direction of movement of the carriage, said instrumentalities including (a) elongated camming means disposed generally at an angle to the direction of movement of said carriage, said camming means comprising an element that is movable from a first position to a second position, (b) a follower for said camming means operatively interposed between said camming means and said cassette and acting when said element is in said first position to engage and traverse said camming means upon movement of said carriage and to move said cassette in a direction transverse to the direction of movement of said carriage, and (c) means for yieldingly holding said follower in contact with said camming means; and selectively operable means for simultaneously controlling the movement of said element as well as the angular positions of said projections.

12. In a spot film device, a carriage for supporting a cassette and transporting it between a shielded position outside the X-ray beam and an exposable position in which the cassette is at least partially within the beam; instrumentalities for moving the supported cassette in a direction transverse to the direction of movement of the carriage, said instrumentalities including (a) elongated camming means disposed generally at an angle to the direction of movement of said carriage, said camming means comprising an element that is movable from a first position to a second position, (b) a first follower operatively interposed between said camming means and said cassette and acting when said element is in said first position to engage and traverse said camming means upon movement of said carriage and to move said cassette in a direction transverse to the direction of movement of said carriage, and (c) means for yieldingly holding said first follower in contact with said camming means during said first follower's traversal thereof; and selectively operable means comprising a rotatable cam having an annular groove of varying radius therein, a second follower for said groove, and a link connecting said groove follower and said element, said link acting upon rotation of said cam between certain angular positions thereof to move said element from one of its recited positions to the other.

13. In a spot film device, a carriage for supporting a cassette and transporting it between a shielded position outside the X-ray beam and an exposable position in which the cassette is at least partially within the beam; instrumentalities for moving the supported cassette in a direction transverse to the direction of movement of the carriage, said instrumentalities including (a) elongated camming means disposed generally at an angle to the direction of movement of said carriage, said camming means comprising an element that is movable from a first position to a second position, (b) a first follower operatively interposed between said camming means and said cassette and acting when said element is in said first position to engage and traverse said camming means upon movement of said carriage and to move said cassette in a direction transverse to the direction of movement of said carriage, and (c) means for yieldingly holding said first follower in contact with said camming means during said follower's traversal thereof; and selectively operable means for moving said element from said first position in which it is engageable by said first follower to said second position where it is not thus engageable, said selectively operable means comprising a pair of rotatable cams, second and third followers each individual to one of said cams, and means linking said second and third followers to said element, each of said cams having an unbroken periphery of varying radius, said cams mounted for rotation together and so oriented with respect to each other that all points on the periphery of one are respectively substantially the same distance from the opposite points on the periphery of the other, said second and third followers disposed on opposite sides of the axis of rotation of said cams and having a substantially constant spacing to enable one of them to engage points of maximum radius on one cam while the other is engaging points of minimum radius on the periphery of the other in order that the aforementioned linking means may hold the aforementioned element in either of its recited positions.

14. In a spot film device, a carriage for supporting a cassette and transporting it between a shielded position outside the X-ray beam and an exposable position in which the cassette is at least partially within the beam; instrumentalities for moving the supported cassette in a direction transverse to the direction of movement of the carriage, said instrumentalities including (a) a pair of elongated camming means each disposed generally at an angle to the direction of movement of said carriage, each of said camming means comprising an element which is movable from a first position to a second position, (b) a pair of following means each individual to one of said camming means and each operatively interposed between a different one of said camming means and said cassette and each acting when the associated element is in its first position to engage and traverse its associated camming means upon movement of said carriage and to move said cassette in a direction transverse to the direction of movement of said carriage, the spaces through which the cassette is moved in response to the traversal of said camming means by their respective following means being different at least in part, and (c) individual means for yieldingly holding both of said following means in contact with their respectively associated camming means during such traversal; and selectively operable means for moving said elements from their respective first positions in which they are engageable by their associated following means to their respective second positions in which they are not thus engageable.

15. In a spot film apparatus, a carriage for supporting a cassette and transporting it between a shielded position outside the X-ray beam and an exposable position in which the cassette is at least partially within the beam; instrumentalities for moving the supported cassette in a direction transverse to the direction of movement of the carriage, said instrumentalities including (a) a pair of elongated camming means each disposed generally at an angle to the direction of movement of said carriage, each of said camming means comprising an element which is movable from a first position to a second position, (b) first and second following means each individual to one of said camming means and each operatively interposed between a different one of said camming means and said cassette and each acting when the associated element is in its first position to engage and traverse the associated camming means upon movement of said carriage and to move said cassette in a direction transverse to the direction of movement of said carriage, the spaces through which the cassette is moved in response to the traversal of said pair of camming means by their respective following means being different at least in part, and (c) means for yieldingly holding said first and second following means in contact with said camming means during such traversal; a rotatable cam having an angularly extending surface to be engaged by a third follower, said surface varying in its radial distance from the axis of the cam; a third follower for said rotatable cam; means linking said third follower to both of said elements, said radial distance being such in certain angular positions of said rotatable cam that one of said elements will be maintained by said third follower and linking means in a position in which said one of said elements is engageable by the following means associated with one of said camming means, said radial distance being such in other angular positions of said cam that the other element will be maintained by said third follower and linking means in a position in which said other element is engageable by the following means for said other camming means, and said radial distance being such in still other angular positions of said rotatable cam that neither of said elements will be engageable by their respectively associated following means.

16. In a spot film device, a carriage for supporting a cassette and transporting it between a shielded position outside the X-ray beam and an exposable position in which the cassette is at least partially within the beam, instrumentalities for moving the supported cassette in a direction transverse to the direction of movement of the carriage, said instrumentalities including (a) a pair of elongated camming means each disposed generally at an angle to the direction of movement of said carriage, each of said camming means comprising an element which is movable from a first position to a second position, (b) first and second following means each individual to one of said camming means and each operatively interposed between a different one of said camming means and said cassette and each acting when the associated element is in its first position to engage and traverse the associated camming means upon movement of said carriage and to move said cassette in a direction transverse to the direction of movement of said carriage, the spaces through which the cassette is moved in response to the traversal of the pair of camming means by their respective following means being different at least in part, and (c) means for yieldingly holding each of said following means in contact with its associated camming means during such traversal; a pair of rotatable cams each individual to one of said elements, each of said rotatable cams having an angularly extending surface to be engaged by a cam follower; third and fourth cam followers each individual to one of said rotatable cams; a first linking means connecting said third follower and one of said elements; a second linking means connecting said fourth follower and the other of said elements; the distance between the axis of each of said rotatable cams and its angularly extending surface varying in such manner that the associated element will be engageable by its associated following means only when the cam follower associated with such cam is engaging certain portions of said surface.

17. In a spot film device, a carriage for supporting a cassette and transporting it between a shielded position outside the X-ray beam and an exposable position in which the cassette is at least partially within the beam; an elongated member disposed generally at an angle to the direction of movement of said carriage, and a lever assembly pivoted to said carriage and operatively interposed between said member and said cassette, said assembly comprising means for engaging and traversing said member upon movement of said carriage, said assembly acting upon such traversal to move said cassette in a direction transverse to the direction of movement of said carriage.

18. In a spot film apparatus, a carriage for supporting a cassette and transporting it between a shielded position outside the X-ray beam and an exposable position in which the cassette is at least partially within the beam; an elongated member disposed generally at an angle to the direction of movement of said carriage, and a device mounted on said carriage for longitudinal movement thereon in a direction transverse to the direction of movement of said carriage, said device operatively interposed between said member and said cassette and acting upon movement of said carriage to be engaged by said member and to move said cassette in a direction parallel to the direction of movement of said device.

19. In a spot film device, a carriage for supporting a cassette and transporting it between a shielded position outside the X-ray beam and an exposable position in which the cassette is at least partially within the beam, a spring for moving said carriage from said shielded position to said exposable position, means for releasably holding said carriage in said shielded position against the action of said spring, a decelerator for slowing down the carriage and bringing it to a gradual stop as it moves to said exposable position under action of said spring, said decelerator comprising an air dash-pot having a plunger adapted to engage an abutment so positioned with respect to said dash-pot that the carriage will stop in a desired position when said plunger has reached the end of its compression stroke, and means associated with said dash-pot for reducing the cross section of the space through which the air escapes from said dash-pot as said plunger approaches said end of said stroke.

20. In a spot film device, a carriage for supporting a cassette and transporting it between a shielded position outside the X-ray beam and an exposable position in which the cassette is at least partially within the beam; selectively operable instrumentalities for moving the supported cassette in a direction transverse to the direction of movement of the carriage; programming means for pre-electing when said instrumentalities shall be operable, said means comprising a ratchet wheel rotatable about a fixed axis, and a pawl on said carriage for advancing said ratchet wheel upon movement of said carriage in one direction, said ratchet wheel acting in certain angular positions thereof to cause said instrumentalities to move said cassette in said transverse direction in response to certain movements of said carriage, said means also acting in certain other angular positions thereof to render said instrumentalities ineffective so that said certain movements of said carriage will not cause concurrent movement of said cassette in said transverse direction.

21. In a spot film device, a carriage for supporting a cassette and transporting it between a shielded position outside the X-ray beam and an exposable position in which the cassette is at least partially within the beam; instrumentalities for moving the supported cassette in a direction transverse to the direction of movement of the carriage, said instrumentalities including (a) a pair of elongated camming means each disposed generally at an angle to the direction of movement of said carriage, each of said camming means comprising an element which is movable from a first position to a second position, (b) a pair of following means each individual to one of said camming means and each operatively interposed between a different one of said camming means and said cassette and each acting when the associated element is in its first position to engage and traverse its associated camming means upon movement of said carriage and to move said cassette in a direction transverse to the direction of movement of said carriage, the spaces through which the cassette is moved in response to the traversal of said camming means by their respective following means being different at least in part, and (c) individual means for yieldingly holding both of said following means in contact with their respectively associated camming means during such traversal; and programming means for pre-selecting when said camming means and said following means shall be operable, said programming means comprising (a) a ratchet wheel rotatable about a fixed axis, (b) a pawl on said carriage for advancing said ratchet wheel upon movement of said carriage in one direction, (c) a first means interposed between said ratchet wheel and one of said elements for selectively positioning said one of said elements in either its aforementioned first or second position in accordance with the angular position of said ratchet wheel, and (d) a second means interposed between said ratchet wheel and the other of said elements for selectively positioning said other of said elements in either its aforementioned first or second position in accordance with the angular position of said ratchet wheel.

22. In a spot film device, a carriage for supporting a cassette and transporting it between a shielded position outside the X-ray beam and an exposable position in which the cassette is at least partially within the beam; instrumentalities for moving the supported cassette in a direction transverse to the direction of movement of the carriage, said instrumentalities including (a) a pair of elongated camming means each disposed generally at an angle to the direction of movement of said carriage, each of said camming means comprising an element which is movable from a first position to a second position, (b) a pair of following means each individual to one of said camming means and each operatively interposed between a different one of said camming means and said cassette and each acting when the associated element is in its first position to engage and traverse its associated camming means upon movement of said carriage and to move said cassette in a direction transverse to the direction of movement of said carriage, the spaces through which the cassette is moved in response to the traversal of said camming means by their respective following means being different at least in part, and (c) individual means for yieldingly holding both of said following means in contact with their respectively associated camming means during such traversal; and programming means for pre-selecting when said camming means and said following means shall be operable, said programming means comprising (a) a ratchet wheel rotatable about a fixed axis, (b) a pawl on said carriage for advancing said ratchet wheel upon movement of said carriage in one direction, and (c) means interposed between said ratchet wheel and common to both of said elements for selectively positioning them so that one of said elements will be in its aforementioned first position when said ratchet wheel is disposed in certain angular positions and so that the other of said elements will be in its aforementioned first position in certain other angular positions of said ratchet wheel, and so that neither of said elements will be in said aforementioned first position in still other angular positions of said ratchet wheel.

23. In a spot film device, an X-radiated area; an area shielded from X-rays; a carriage for supporting a movable cassette holder; a ratchet wheel rotatable about a fixed axis; a pawl on said carriage for advancing said ratchet wheel upon movement of said carriage in one direction; and means interposed between said ratchet wheel and said holder for moving said holder into various pre-selected positions with respect to said X-radiated area upon movement of said carriage from said shielded area, said pre-selected positions varying in accordance with the angular position of said ratchet wheel.

24. In a spot film device, an X-radiated area; an area shielded from X-rays; a carriage mounted for movement between said areas; a cassette holder mounted on said carriage for movement in a direction transverse to the direction of movement of said carriage; means for locking said holder against movement with respect to said carriage; means for releasing said locking means during a first portion of the travel of said carriage from said shielded area; and means for moving said holder relative to said carriage during a second portion of the movement of said carriage from said shielded area.

References Cited in the file of this patent
UNITED STATES PATENTS

| | | |
|---|---|---|
| 2,291,139 | Borthwick | July 28, 1942 |
| 2,552,858 | Mueller et al. | May 15, 1951 |
| 2,679,599 | Stuhlman | May 25, 1954 |
| 2,709,221 | Haupt et al. | May 24, 1955 |
| 2,749,445 | Stava et al. | June 5, 1956 |